United States Patent [19]

Koester et al.

[11] Patent Number: 5,474,353
[45] Date of Patent: Dec. 12, 1995

[54] PIVOTING SEAT CUSHION ARRANGEMENT FOR VEHICLE SEAT ASSEMBLIES

[75] Inventors: Daniel J. Koester, Ann Arbor; Robert L. Demick, East Pointe; Benny T. Vo, Ypsilanti; Duane E. Potes, Jr., Adrian; Basil M. Freeman, Weberville, all of Mich.

[73] Assignee: Hoover Universal, Inc., Plymouth, Mich.

[21] Appl. No.: 160,564

[22] Filed: Dec. 1, 1993

[51] Int. Cl.$^6$ .................................................. B60N 2/14
[52] U.S. Cl. .................... 296/65.1; 296/68; 297/344.21
[58] Field of Search ........................ 296/65.1, 68, 68.1; 297/344.21, 344.22, 344.23, 344.24, 240, 242

[56] References Cited

U.S. PATENT DOCUMENTS

| | | |
|---|---|---|
| 2,576,004 | 11/1951 | Fair . |
| 2,822,858 | 2/1958 | Mussler .................................. 296/68 |
| 2,992,852 | 7/1961 | Loofbourrow et al. ................ 296/68 |
| 3,046,052 | 7/1962 | Summers . |
| 3,051,522 | 8/1962 | Myers .................................... 296/68 |
| 3,066,979 | 12/1962 | Pitts et al. ...................... 297/344.24 X |
| 3,104,911 | 9/1963 | James et al. .......................... 296/68 |
| 3,253,856 | 5/1966 | Ueda ............................ 297/344.21 X |
| 4,733,903 | 3/1988 | Bailey ................................ 296/65.1 |
| 4,802,706 | 2/1989 | Onimaru et al. ................. 296/65.1 X |
| 4,844,543 | 7/1989 | Ochiai .............................. 296/65.1 X |
| 4,988,134 | 1/1991 | Vidwans et al. . |
| 5,040,832 | 8/1991 | Zalewski .......................... 296/65.1 |

FOREIGN PATENT DOCUMENTS

| | | |
|---|---|---|
| 568482 | 2/1983 | Australia . |
| 82409/82 | 3/1983 | Australia . |
| 1312814 | 1/1993 | Canada . |
| 0343026 | 11/1989 | European Pat. Off. . |
| 2507978 | 12/1982 | France . |
| 2695886 | 3/1994 | France . |
| 3320989 | 12/1984 | Germany . |
| 58-183320 | 10/1983 | Japan ................... 297/344.21 |
| 2088296 | 6/1982 | United Kingdom . |
| 2236476 | 4/1991 | United Kingdom . |

Primary Examiner—Dean Kramer
Attorney, Agent, or Firm—Leonard J. Kalinowski; E. L. Levine; Joseph E. Root, III

[57] ABSTRACT

A vehicle seat assembly includes a fixed seat portion which is adapted to be mounted on the floor of a vehicle and a movable seat portion which is mounted on the fixed seat portion and adapted to be moved between a normal use or drive position and an access position where the front edge of the movable seat portion overlies the sill of the vehicle to facilitate egress from the vehicle, the movable seat portion providing substantial support for the occupant at the drive position and during its movement to the access position, the vehicle seat assembly including mechanisms for pivoting and/or sliding movement of the movable seat portion relative to the fixed seat portion and for locking the movable seat portion to the fixed seat portion to prevent unwanted movement of the movable seat portion. Also disclosed are systems wherein the movable seat cushion arrangement is supplemented by hand grips on the vehicle positioned to be grasped by an individual upon ingress into or egress from the vehicle to facilitate the ingress by an individual into and egress out of a vehicle through a door opening of the vehicle.

23 Claims, 12 Drawing Sheets

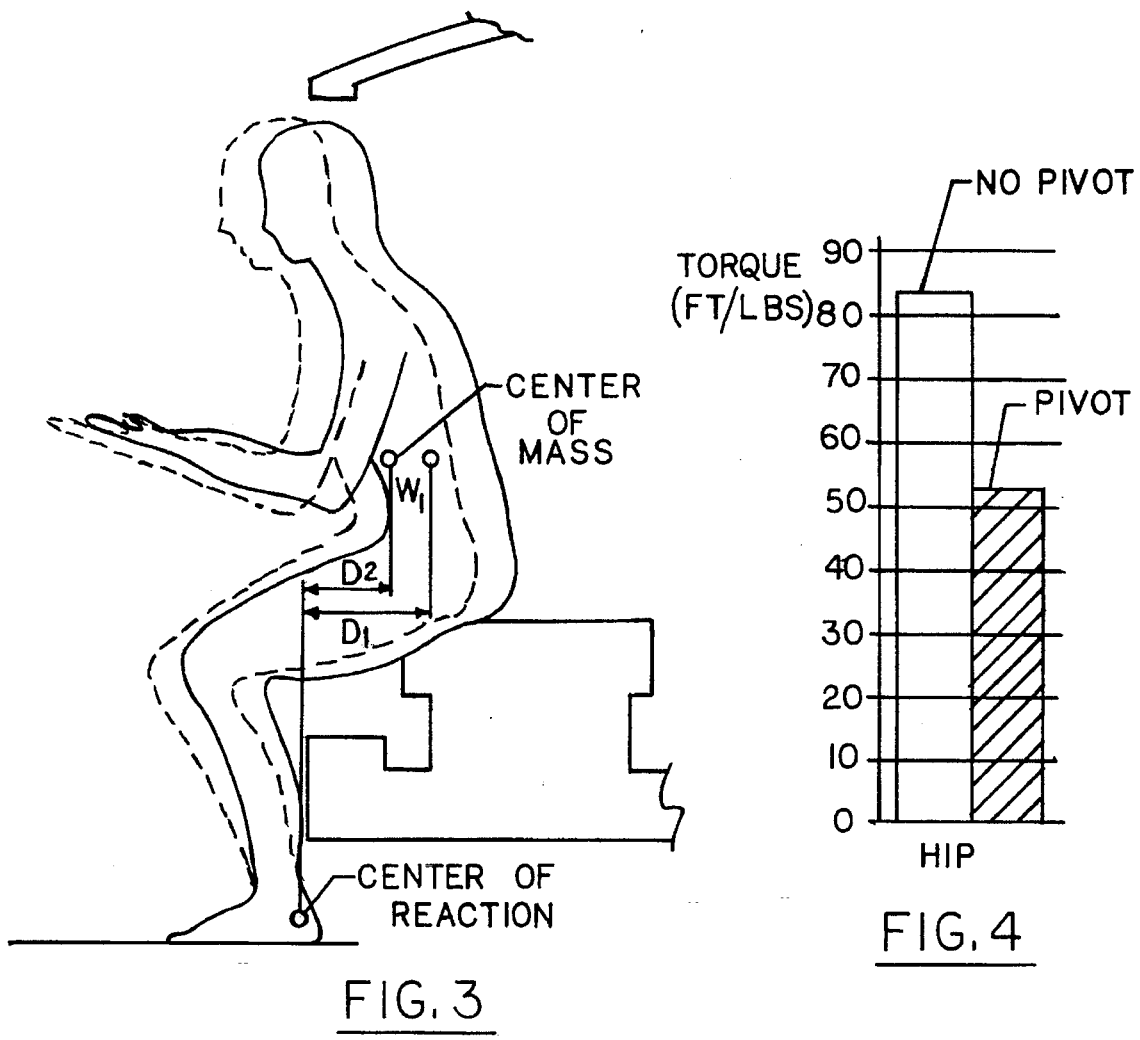
FIG. 3
FIG. 4
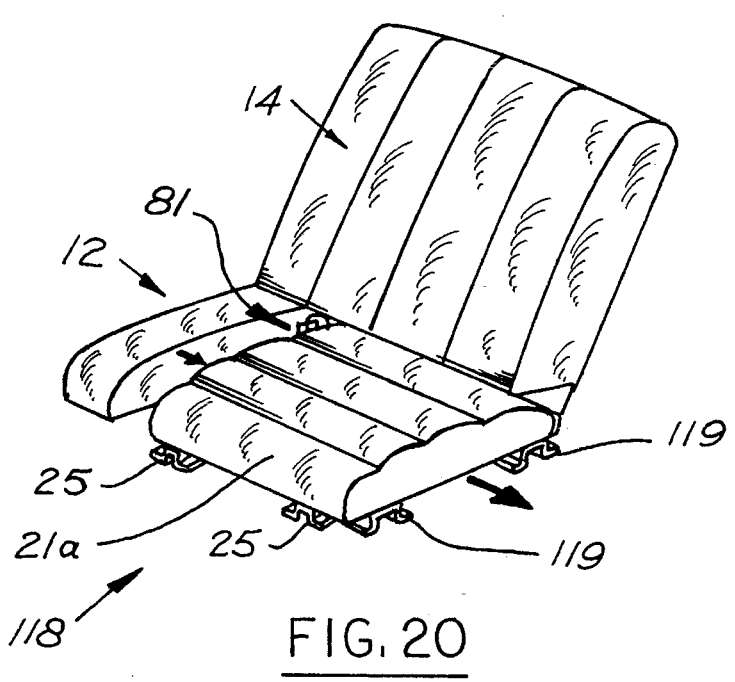
FIG. 20

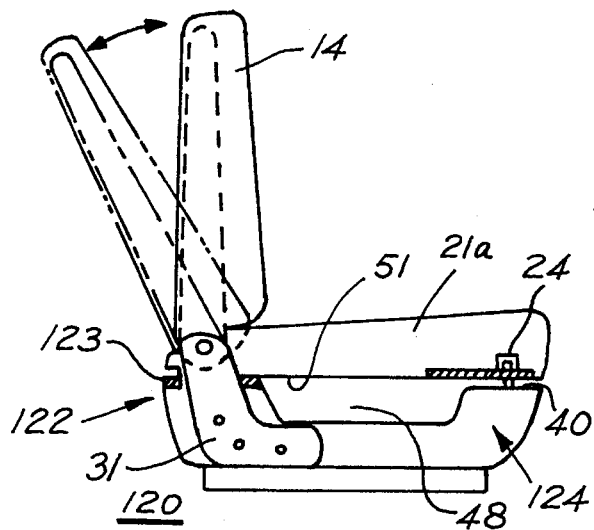
FIG. 21
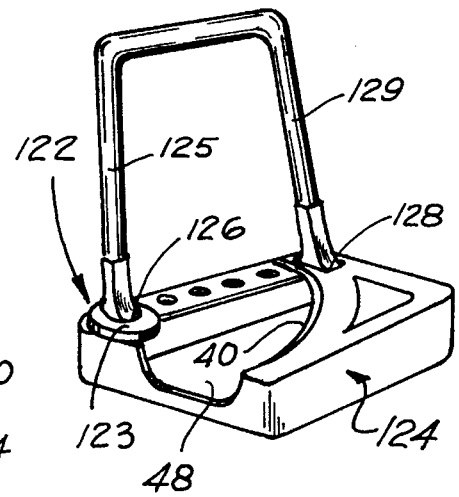
FIG. 22
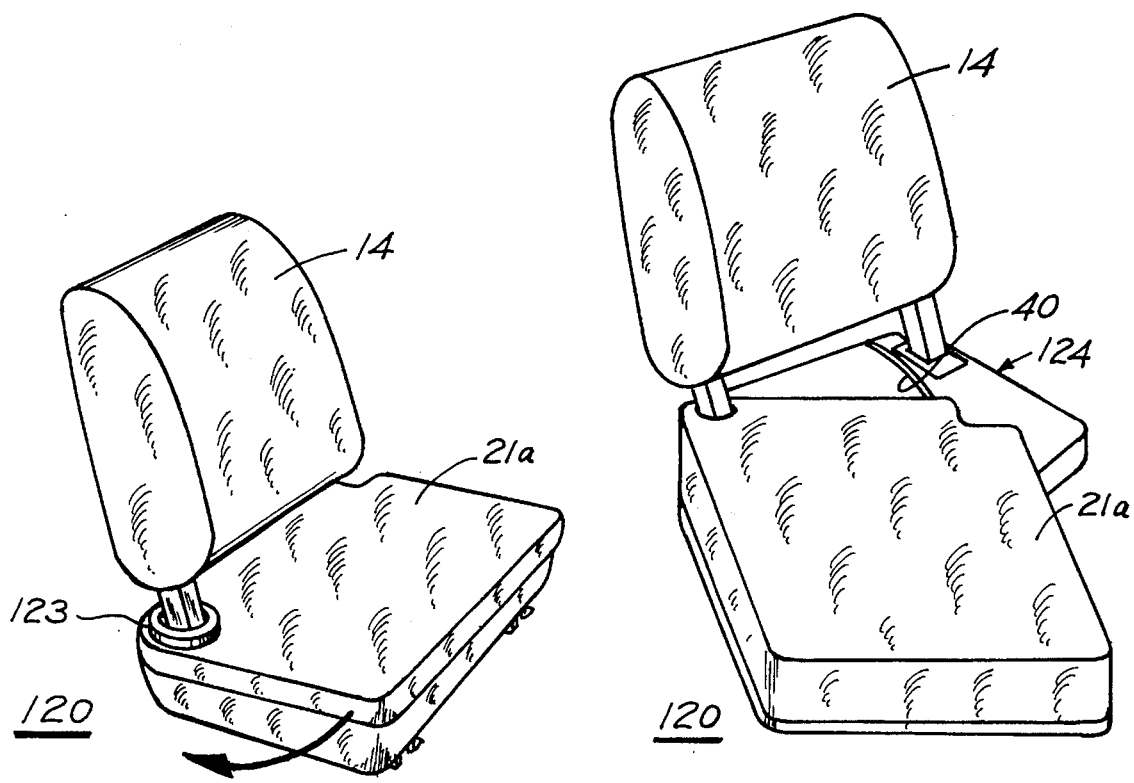
FIG. 23
FIG. 24

5,474,353

PIVOTING SEAT CUSHION ARRANGEMENT FOR VEHICLE SEAT ASSEMBLIES

BACKGROUND OF THE INVENTION

This invention relates to seat assemblies for motor vehicles and the like, and more particularly to a pivoting seat cushion arrangement for vehicle seat assemblies.

Ingress into and egress from motor vehicles such as passenger cars, station wagons, vans and the like, can be a difficult task, especially for individuals with movement impairments due to disability, illness, or advanced age. A number of arrangements have been proposed which aid in the transfer process, primarily through seat and door mechanisms. Most of these arrangements address individuals with moderate to severe disabilities, and in particular wheelchair users. Thus, the arrangements incorporate mechanisms which move the individual completely out of the vehicle. As a result, these mechanisms are very complicated and expensive and are not available for general use.

In Great Britain Patent Application no. 2 088 296, entitled Vehicle Seats, there is disclosed a vehicle seat particularly applicable to individuals with a movement impairment who are confined to wheelchairs. The vehicle seat is mounted on a swivel for pivoting movement about a pivot axis, the swivel being mounted on an arm which, in turn, is pivotally coupled to the door pillar so that the seat can be swung from a position of normal use to a position outside the door opening of the vehicle. The seat pivoting mechanism includes a guide track which ensures that the seat faces inwardly as it moves through the door opening. Providing a pivotally mounted, swiveling seat that is moved along a guide track for orienting the seat in an inwardly facing direction as it moves through the door opening, requires a complicated transport mechanism for the vehicle seat. Also, the pivot is mounted on the sidewall of the vehicle and extends vertically from the roof to the floor of the vehicle along the side of the seat so that the pivot axis is displaced rearwardly and laterally of the swivel mounted seat. The combined swivel and pivot mounting of the vehicle seat results in a movement that is considerably different from the movement encountered by an individual during normal egress from a vehicle. Moreover, this seat does not appear adaptable to provide conventional fore and aft seat adjustment, reclining seat capability, or a seat dumping capability as is required for two door vehicles, and as such, this seat arrangement has limited application.

In Australian patent application no. 82409/82, entitled Vehicle Seat Mounting Mechanism, which was filed on Apr. 7, 1981, there is disclosed an arrangement for moving a seat into and out of a vehicle to provide an individual with better ingress and egress. The arrangement includes a pivot mechanism and a slide rail mechanism which move the seat completely out of the vehicle in a two step operation. The pivot mechanism provides for pivoting the seat 90° about its outboard rear corner to a position within the vehicle where the seat faces outwardly. When the seat is in this outwardly facing position, the slide rail mechanism enables the seat to be slid laterally of the vehicle through the door opening to a position outside of the vehicle. Because two different operations are required to first align the seat with the door opening of the vehicle and to then move the seat through the door opening, this arrangement requires a complicated transport mechanism for the vehicle seat. In addition, because of the two step operation whereby an occupant of the seat is first pivoted within the vehicle and then moved outwardly through the door opening, the motion that is imparted to an individual being transported out of the vehicle is totally different from the movement of an individual during normal egress from the vehicle. Moreover, the seat must be in a specified fore-aft position before it can be pivoted into alignment with the door opening. Consequently, it is generally necessary to readjust the fore and aft travel adjustment whenever the feature is used to facilitate an individual's ingress into or egress from the vehicle.

In both of these seat moving arrangements, the entire seat is transported completely out of the vehicle. Therefore, the seat must be located high enough within the vehicle to clear the rocker as the seat is pivoted outwardly through the door opening, making application of these seat moving arrangements to the driver's seat impractical because of interference between the legs of the driver and the steering wheel, for example. In addition, neither arrangement includes hand grips for use by the occupant of the seat during ingress into or egress from the vehicle or lifting off from the seat.

SUMMARY OF THE INVENTION

The present invention provides a vehicle seat assembly in which a portion of the seat cushion is adapted to be moved relative to the remainder of the seat cushion from a normal use position to an access position where at least a portion of an edge of the seat cushion portion overlies the rocker of the vehicle to facilitate ingress into and egress from the vehicle. In one embodiment, the movable seat portion is adapted to pivot relative to the fixed seat portion between the normal use or drive position and the access position. The pivot axis is located beneath the pivoting seat portion and the movable portion of the seat pivots in a substantially horizontal plane and over a limited range in the order of 40° to 50° so that the pivoting movement of the pivoting seat portion from the drive position to the access position corresponds to the movement of an individual during normal egress from the vehicle. The vehicle seat assembly includes a pivot means, which mounts the pivoting seat portion on the fixed seat portion, enabling the pivoting seat portion to be pivoted relative to the fixed seat portion between a normal use or drive position and an access position. The fixed seat portion is supported on and secured to the floor of the vehicle and provides at least fore and aft adjustment for the seat assembly. The pivoting seat portion provides the cushion support for an occupant of the vehicle both when the pivoting seat portion is in the normal use position and during movement of the pivoting seat portion to the access position.

Because the pivot axis is located beneath the seat and near the rear outboard corner of the vehicle seat assembly, the movable seat cushion moves with the occupant in the way that the occupant normally egresses, permitting ease in ingress into as well as egress from the vehicle. Only a portion of the seat, namely part of the seat cushion and part of the seat back cushion, pivots. The location of the pivot under the seat, the limited range of movement together and the fact that only part of the seat cushion pivots, makes the pivoting seat cushion arrangement provided by the present invention simpler in construction and considerably less expensive than known arrangements. The pivot arrangement according to the present invention is particularly adapted for individuals with mildly limited mobility, such as the elderly, rather than for individuals with moderate or severe impairment and in particular wheel chair users.

Further in accordance with the present invention, there is provided a system for facilitating an individual's ingress into and egress out of the vehicle through a door opening of the vehicle. The system comprises a vehicle seat assembly including a fixed seat portion, a pivoting seat portion mounted on the pivoting seat portion and adapted to pivot relative to the fixed seat portion between a drive position and an access position, with a pivoting movement that corresponds to the movement of an individual during normal egress from the vehicle, and a hand grip disposed on a portion of the vehicle adjacent to the door opening and located to be gripped by an individual during ingress into and/or egress from the vehicle. In one embodiment, the hand grip is by the outboard side of the fixed seat portion. In other embodiments, the hand grip is formed integrally with the "A" pillar and/or the "B" pillar of the vehicle, or is formed integrally with the rocker of the vehicle. In an embodiment which includes two hand grips, the hand grips are formed integrally with the frame of the vehicle at diametrically opposed positions along the door opening. In a further embodiment, the roof of the vehicle has a cutout portion above the door opening and the vehicle door includes a complementary shaped extension portion which is located to be received in the cutout portion of the roof when the door is closed, the door extension portion defining a hand grip when the door is open.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 3 illustrates the relationship between the center of mass and the center of reaction for an individual alighting from a vehicle seat both with and without the benefit of the pivoting seat cushion arrangement;

FIG. 4 is a bar graph illustrating hip torque for an individual alighting from a vehicle seat both with and without the benefit of the pivoting seat cushion arrangement;

FIG. 20 is a perspective view of a vehicle seat assembly in which a portion of the seat cushion is movable laterally towards the outboard side of the vehicle;

FIG. 21 is a side elevation view, in section, of a vehicle seat assembly including a reclineable seat back and having a seat cushion portion adapted for pivoting movement relative to the fixed portion of the vehicle seat assembly between normal use and access positions;

FIG. 22 is perspective view of the frame for the fixed seat portion of the seat assembly shown in FIG. 21;

FIG. 23 is a perspective view of the vehicle seat assembly of FIG. 21 shown in the normal use position;

FIG. 24 is a perspective view of the vehicle seat assembly of FIG. 21 shown in the access position;

DESCRIPTION OF A PREFERRED EMBODIMENT

Figure 1:
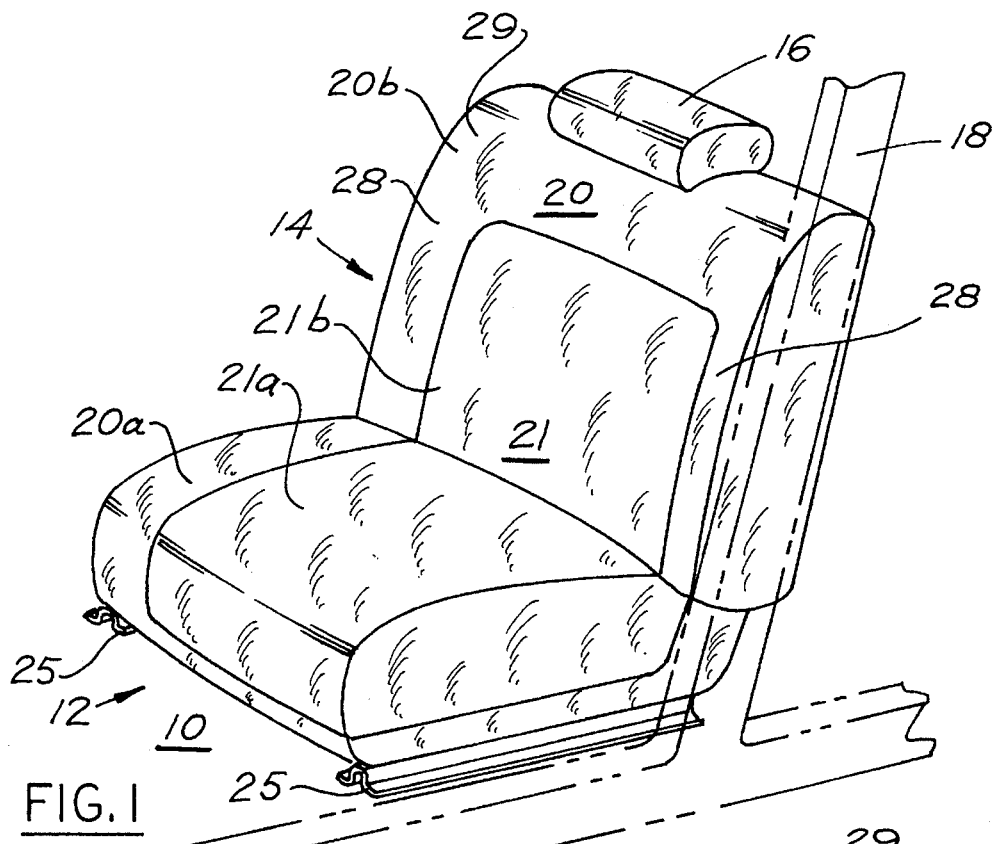
FIG. 1 is a perspective view of a vehicle seat assembly incorporating the pivoting seat cushion arrangement according to the present invention, with the pivoting seat portion shown in the normal use or drive position.
Figure 2:
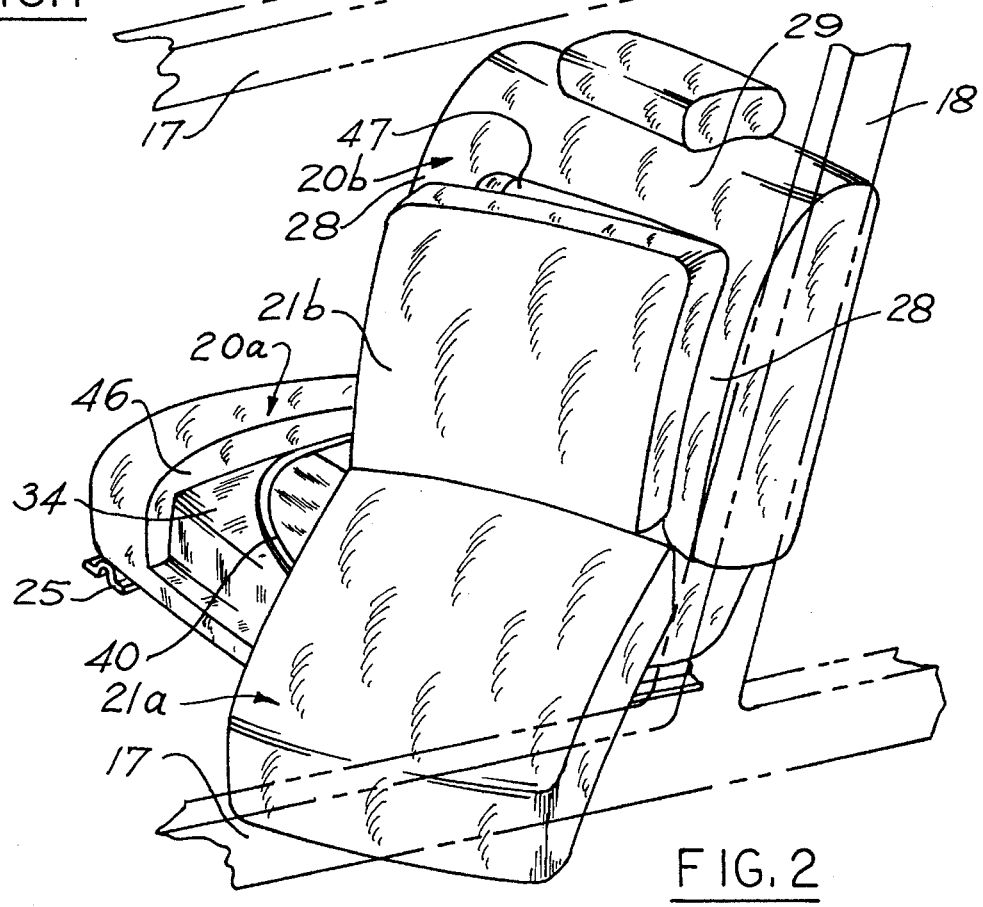
FIG. 2 is a view similar to FIG. 1, but with the pivoting seat portion shown pivoted relative to the fixed portion of the vehicle seat assembly to the access position.
Figure 8:
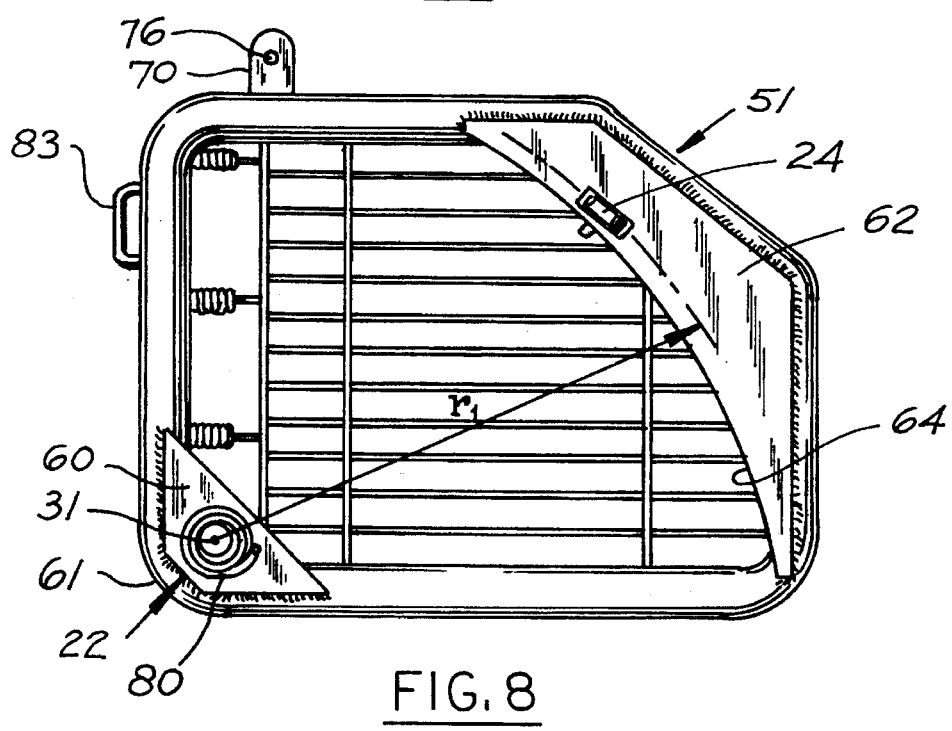
FIG. 8 is a bottom view of the seat cushion support of the pivoting seat portion, illustrating the pivot and guide roller mechanisms.

Referring to FIGS. 1 and 2 of the drawings, there is shown a vehicle seat assembly 10 incorporating the pivoting seat cushion arrangement provided by the present invention. The vehicle seat assembly 10 includes a seat cushion 12 and a seat back 14 attached to the seat cushion, the seat having a head rest 16 at its upper edge. In accordance with the invention, the seat cushion and seat back include a fixed portion 20 and a movable portion 21. The movable seat portion 21 is supported on the fixed seat portion 20 for guided pivoting movement relative to the fixed seat portion from a normal use or "drive" position, illustrated in FIG. 1, to an access position illustrated in FIG. 2 where at least a portion of an edge of the pivoting seat portion, that is a portion of the front edge, extends or overlies the sill or rocker 17 of the vehicle forward of the "B" pillar 18. Although in FIG. 2 only a portion of one edge, namely the forward outboard corner, of the pivoting seat portion 21, is shown overlying the sill or rocker 17 of the vehicle, the wording "at least a portion of an edge of the pivoting seat portion" is intended to encompass more or less than the forward outboard corner of the pivoting seat portion 21, such as for example, the entire front edge of the pivoting seat portion or the entire side edge of the pivoting seat portion, as is illustrated in FIG. 20. The mechanism providing the guided pivoting movement for the pivoting seat portion 21 includes a pivot assembly 22 and guide rollers 23 and 24, which are shown in FIG. 8. The pivot assembly 22 and guide rollers 23 and 24 provide smooth pivoting movement of the pivoting seat portion 21 in a substantially horizontal plane. As will be shown, the vehicle seat assembly 10 includes one or more latch mechanisms for preventing the pivoting seat portion from pivoting relative to the fixed seat portion except during ingress or egress.

The fixed seat portion 20 defines the base structure for the vehicle seat assembly 10. The fixed seat portion 20 is supported on and anchored to the floor of the vehicle in the conventional manner by standard manual or power inboard and outboard slide rail assemblies 25, providing fore and aft movement in the manner known in the art. The fixed seat portion 20 includes a partial seat section 20a which defines the inboard side of the seat cushion and a partial seat back section 20b, including generally vertically extending side portions 28 defining the inboard and outboard sides of the seat back and a portion 29 extending horizontally between the upper ends of the side portions 28, defining the upper portion of the seat back.

The pivoting seat portion 21 defines the main cushion support surface for the occupant and is affixed to fixed seat portion or base structure by the pivot assembly 22 which defines a pivot axis which extends substantially vertically.

The pivoting seat portion 21 includes a partial seat section 21a and a partial seat back section 21b. The partial seat section 21a serves as the seat cushion for the occupant and the partial seat back section 21b serves as the seat back cushion for the occupant of the seat, providing substantial seat and back support for the occupant both when the pivoting seat portion is in the drive position and during movement to and from the access position. The pivoting seat portion provides adequate seat cushion dimensions for all occupants as well as support for the back through the mid-thoracic region. The additional support provides needed stability for the occupant during both ingress and egress.

Importantly, the pivoting movement of the pivoting seat portion 21 from the drive position to the access position corresponds to the movement of an individual during normal egress from the vehicle. Typically, during egress from a vehicle, a person pivots on the seat cushion while swinging the outboard leg outwardly through the door opening and slightly upwards to clear the sill and pushing off with the inboard leg, until the individual is facing the door opening at an angle of about 40° to 50° to the doorway. At this point, the individual lifts off from the seat while extending the inboard leg to the ground until a full standing position is reached with both feet on the ground, i.e., a one foot egress. Alternatively, a person may pivot on the seat cushion while swinging the outboard leg outwardly through the door opening and slightly upwards to clear the sill and pushing off with the inboard leg, followed by swinging the inboard leg outwardly through the door opening and slightly upwards to clear the sill, achieving a similar posture with the individual facing the door opening at an angle of about 40° to 50° but with both legs out of the doorway. At this point, the individual lifts up from the seat with both feet on the ground, i.e., a two foot egress. The pivoting seat arrangement according to the present invention promotes improved egress for both of these egress methods.

Testing of a vehicle seat assembly including the pivoting seat cushion arrangement in accordance with the present invention demonstrated that during egress from a vehicle, an occupant of the seat is moved four to six inches further out of the vehicle than when that individual is egressing from the same vehicle but with the seat fixed. It has been determined that a biomechanical advantage is obtained in using the pivoting seat arrangement provided by the present invention. Referring to FIG. 3 which illustrates the relationship between the center of mass and the center of reaction for an individual alighting from a vehicle seat, the solid line represents the position of an individual while alighting from a conventional seat and the dashed line represents the position of an individual while alighting from a vehicle seat that is equipped with the pivoting seat arrangement. The individual's feet are shown positioned on the ground outside of the vehicle, just before lifting off from the seat. The moment $M_{com}$ of the center of mass $W_1$ about the center of reaction is defined by the equation:

$$M_{com} = D_1 * W_1$$

where $D_1$ is the moment arm or separation in a horizontal plane between the center of mass and the center of reaction for an individual alighting from a conventional vehicle seat. For an individual alighting from a seat equipped with the pivoting seat arrangement, the center of mass is translated further out of the vehicle than without the benefit of the pivoting seat arrangement so that the separation $D_2$ is less than $D_1$. The results of testing that was conducted has indicated that with the benefit of the pivoting seat arrangement according to the present invention, an individual is translated approximately 5 to 6 inches toward the outboard side of the vehicle and partially over the sill 17. The separation between the center of mass and the center of reaction is approximately 10 to 12 inches for a seat equipped with the pivoting seat arrangement according to the present invention. The separation between the center of mass and the center of reaction for a vehicle seat without the benefit of the lateral translation afforded by the pivoting seat is approximately 15 to 18 inches, i.e., 5 to 6 inches greater than for a vehicle seat equipped with the pivoting seat arrangement. On the basis of measurements that were taken, the average separation $D_2$ was generally about 12 inches and the average separation $D_1$ was about 18 inches so that $D_2$ was approximately equal to $\frac{2}{3}D_1$. It follows that:

$$M_{com}(\text{pivot}) \approx \frac{2}{3} M_{com}(\text{no pivot})$$

This represents an approximate 33% reduction in the moment of the center of mass about the center of reaction by decreasing the moment arm.

The measurements were taken for several individuals having different body sizes, i.e., different heights, weights, etc. as the individuals moved into and out of a vehicle. The measurements were taken both for a conventional vehicle seat and for a vehicle seat equipped with the pivoting seat arrangement. The placement of the foot was maintained the same and the orientation of the back was held constant. Only the position of the center of mass was changed due to the pivoting action of the seat which translated the center of mass outwardly a distance corresponding to the difference between $D_1$ and $D_2$. This reduction in the moment arm results in a corresponding reduction in the force to be overcome by a person about to stand up after moving to face the doorway of the vehicle.

To confirm this reduction in force to be overcome by an individual alighting from a vehicle, the measurement data obtained was processed to determine the effect on hip torque when an individual is alighting from a vehicle with and without the benefit of the pivoting seat arrangement. The data was used as an input to a computer program commercially available from Human Cad of Melville, N.Y. 11747 under the trade name MANNEQUIN. Results obtained are illustrated in bar graph form in FIG. 4. The bar graph of FIG. 4 illustrates hip torque for an individual alighting from a conventional vehicle seat assembly and for an individual alighting from a vehicle seat assembly equipped with the pivoting seat arrangement according to the present invention. For the data obtained by the testing, the analysis indicated that the hip torque decreased from about 83 lb.ft. to about 53 lb.ft during egress. This corresponds to approximately a 33% reduction in hip torque for an individual leaving a vehicle using a seat equipped with the pivoting seat arrangement, making egress from a vehicle both easier and less stressful for individuals, and in particular for those who are mildly movement impaired.

Figure 5:
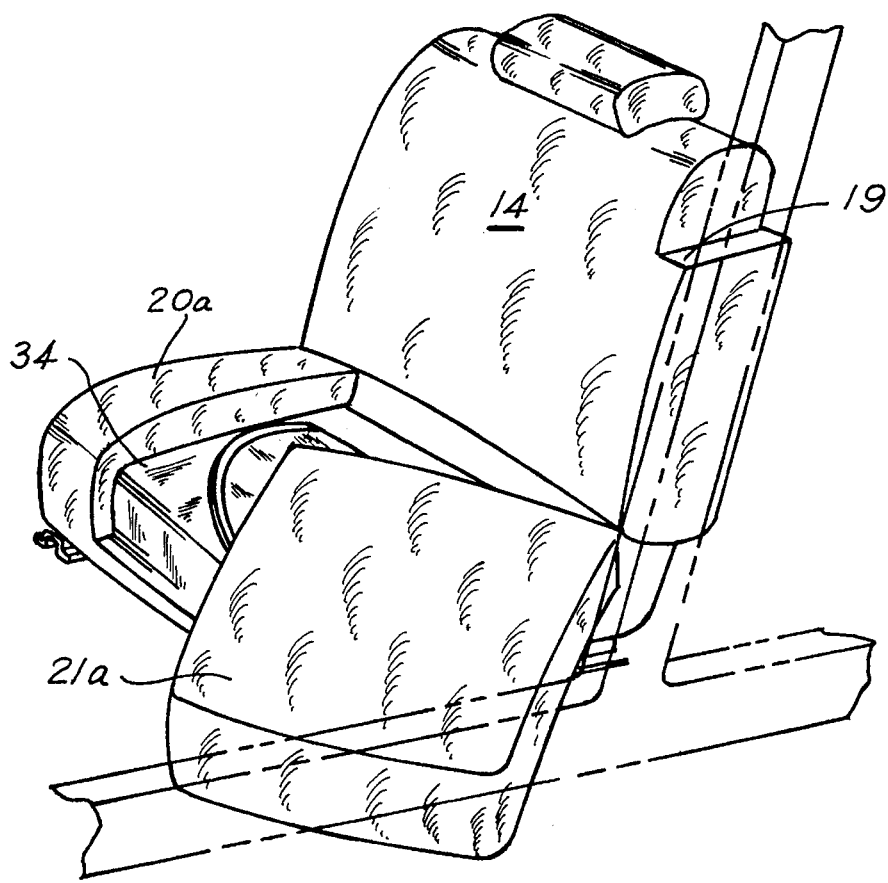
FIG. 5 illustrates an embodiment of the vehicle seat assembly wherein only the seat cushion portion is pivoted relative to the fixed portion of the vehicle seat assembly.

Referring to FIG. 5, there is illustrated an embodiment of a vehicle seat assembly 10' in which the entire seat back of the vehicle seat assembly 10' is fixed, and only a portion of the seat cushion, in particular, the portion 21a that provides support for the occupant of the seat, is adapted to pivot relative to the remainder of the seat assembly. The seat back includes a push off shoulder 19 on its outboard side which is located within reaching distance by the occupant during egress from the vehicle. The pivot mechanism and the guide assembly are the same as for the vehicle seat assembly 10. The vehicle seat assembly 10' includes one or more latch mechanisms which are similar to those for the vehicle seat assembly 10 for preventing the pivoting seat portion from pivoting relative to the fixed seat portion except during ingress or egress.

Figure 6:
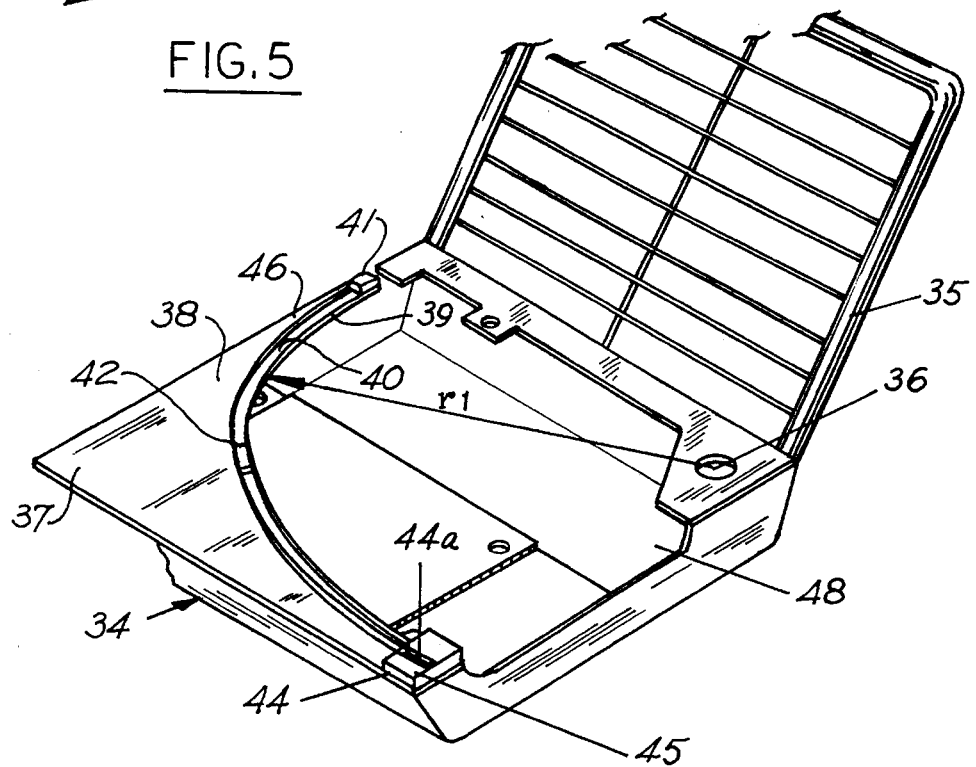
FIG. 6 is a view of the seat pan and seat back frame of the fixed seat portion.
Figure 10:
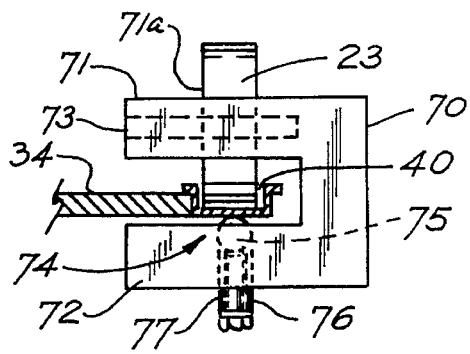
FIG. 10 is a fragmentary view in section of a portion of the seat pan and seat cushion support, illustrating the relationship between one of the guide rollers and the seat pan of the fixed seat portion.

Referring to FIGS. 2 and 6, the fixed seat portion 20 includes a seat pan 34 and a seat back frame 35. The seat pan 34 is similar to conventional seat pans, but includes an aperture 36 at its rear outboard corner which receives a pivot pin 33 (FIG. 8) of the pivot assembly 22. The front inboard corner 37 of the seat pan 34 includes a generally flat plate-like portion 38 having an inwardly directed arcuate edge 39. The upper surface 43 of the portion 37 along its arcuate edge 39 defines an arcuate guide track 40 for the guide rollers 23 and 24 (FIG. 8). The guide track is illustrated in FIGS. 6 and 10 as being in the form of a channel on the edge of the plate-like portion. Alternatively, the channel could be eliminated and the guide rollers could ride directly on the flat upper surface of the plate 38. The centerline of the guide track 40 extends at a radius $r_1$ drawn from the center of the aperture 36 which point corresponds to the pivot axis 31. The guide track 40 includes travel limit stops 41 and 42 on the surface thereof which cooperate with guide roller 23 to limit the travel of the pivoting seat portion 21 to define the drive and access positions for the pivoting seat portion 21. The plate-like portion 38 includes a raised portion 44 having a recess 44a near the front outboard corner 45 of the seat pan 34. The raised portion 44, which may be defined by a nylon or plastic member, serves as a bearing surface for frame 51 of the pivoting seat portion. The raised portion 44 underlies the plate 62 (FIG. 8) of the pivoting seat frame 51, providing a smooth glide surface for the front of the pivoting seat portion. In addition, the recess 44a cooperates with guide roller 24 to provide a detent, permitting the pivoting seat portion 21 to be maintained at the access position. The outboard side of the seat pan has a contoured side portion 48 defining an opening to allow the suspended buttocks of the occupant of the seat to travel across the side of the seat pan.

Referring to FIG. 2, the inboard edge of the seat pan is covered with cushion material defining the partial seat section 20a, the cushion material being secured to the seat pan 34 in a conventional manner. The uncovered portion of the seat pan defines a generally rectangular area 46 which receives the seat cushion section 21a of the pivoting seat portion 21 when the pivoting seat portion 21 is in the drive position and the partial seat sections 20a and 21a provide the appearance of a whole or complete seat cushion for the vehicle seat assembly.

Referring additionally to FIG. 6, the seat back frame 35 is generally rectangular in shape and is attached to the seat pan 34 in a suitable manner and is fixed relative to the seat pan 34. The seat back frame 35 is partially covered with cushion material defining the seat back portions 28 and 29, the cushion being secured to the seat back frame 35 in a conventional manner. The uncovered portion of the seat back frame 35 defines a generally rectangular recessed or cutout area 47 which receives the seat back section 21b of the pivoting seat portion 21 when the pivoting seat portion 21 is in the drive position. When the pivoting seat portion 21 is in the drive position, the pivoting seat portion 21 appears to be an integral part of the fixed seat portion 20 and the partial seat back sections 20b and 21b providing the appearance of a whole or complete seat back for the vehicle seat assembly.

Figure 7:
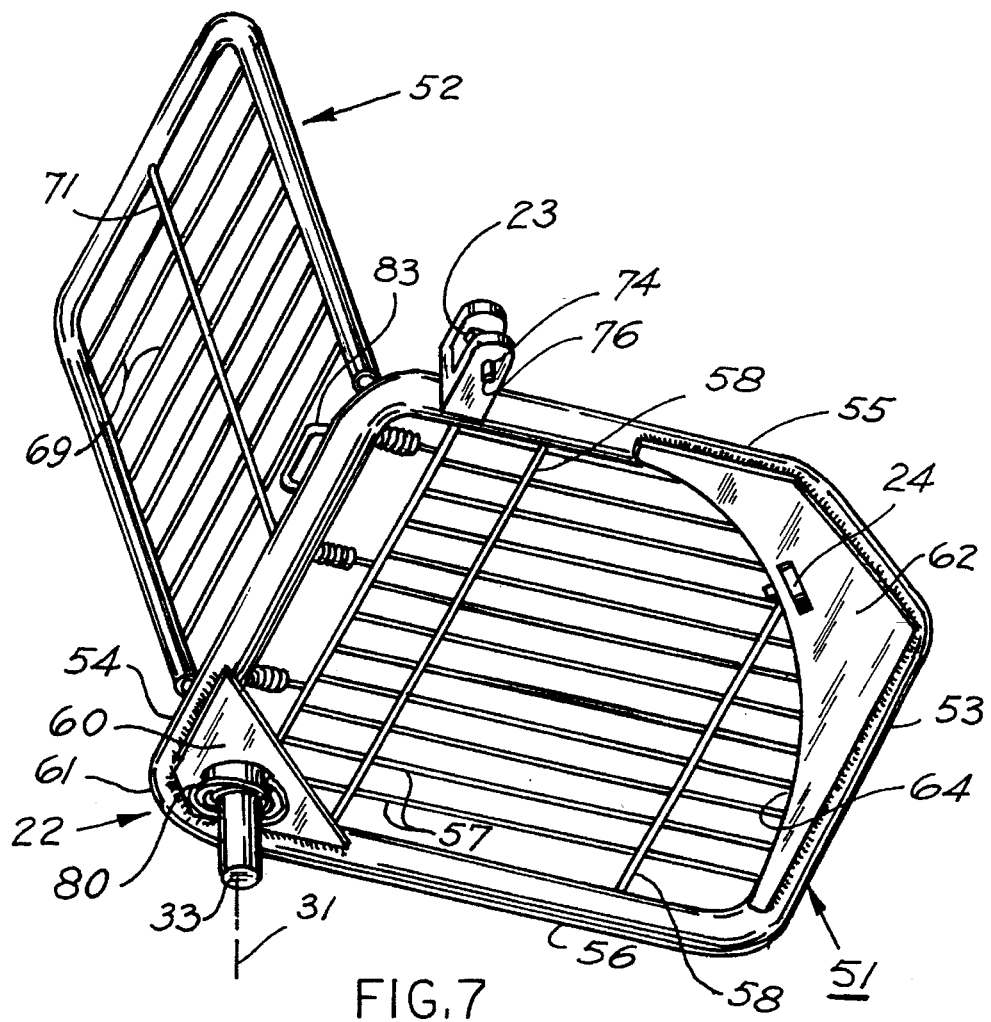
FIG. 7 is a bottom perspective view of the seat cushion support and seat back frame of the pivoting seat portion.

Referring to FIGS. 7 and 8, the pivoting seat portion includes a seat cushion support frame 51 and a seat back cushion frame 52. The seat cushion support frame 51 is a one-piece tubular frame generally rectangular in shape and having a front 53, a back 54, an inboard side 55 and an outboard side 56. The seat cushion support frame 51 includes cushion supports 57, extending between the front 53 and back 54 of the frame 51, and lateral support members 58, extending between the inboard side 55 and outboard side 56 of the frame 51, which support the seat cushion of the partial seat section 21a (FIG. 2). The seat cushion is secured to the seat cushion support frame 51 in a conventional manner.

The seat back cushion support frame 52 is a U-shaped, tubular member which is attached to the seat cushion support frame 51 at the back thereof. The seat back cushion support includes a conventional suspension mat formed by cross members 69 which extend horizontally between the uprights and a vertical support member 71 which extends between the upper member and the seat cushion support frame 51. The seat back cushion support frame 52 is rigidly attached to the seat cushion support frame in a suitable manner, such as by welding. The seat back cushion is secured to the seat back frame 52 in a conventional manner.

The seat cushion support frame 51 includes a plate 60 at its rear inboard corner 61 which mounts the pivot assembly 22 and a plate 62, having an arcuate inner edge 64, which supports the guide roller 24 near the front inboard edge of the support frame. The arcuate edge 64 locates the guide roller 24 at a point which is diametrically opposed to the pivot axis 31 defined by the pivot pin 33. Thus, the guide roller 24 is located along a radius drawn from the pivot axis and extending at an angle of approximately 45° relative to the back 54 of the seat cushion support frame 51 when the pivoting seat portion 21 is in the normal use or "drive" position.

Figure 9:
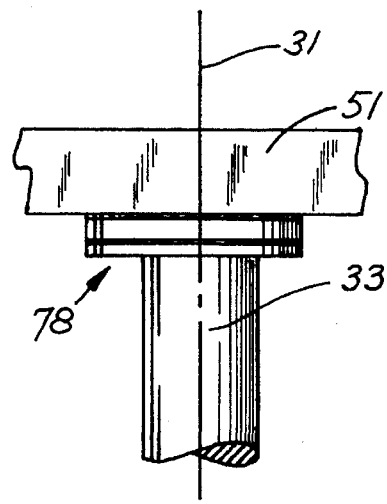
FIG. 9 is an elevation view of the pivot mechanism.

Referring to FIG. 9, the pivot assembly 22 includes an anti-friction bearing assembly 78, which is interposed between the seat cushion support frame 51 and the seat pan 34, and a pivot pin 33 which depends downwardly from the frame 51 and extends through the bearing assembly. The bearing assembly provides a substantially friction free interface between the upper surface of the seat pan 34 and the lower surface of the seat cushion support frame 51. The pivot pin has a shank that is 2 inches in length and is ⅝ inch in diameter. One anti-friction bearing assembly suitable for this purpose is the INA thrust needle roller bearing assembly, commercially available from INVETECH, Detroit, Mich. This needle thrust needle roller bearing assembly includes a needle roller cage assembly and thrust washer having a ⅝ inch inner diameter and a 1¼ inch outer diameter. A return spring 80 biases the pivoting seat portion 21 to the drive position so that after an occupant has moved the seat portion 21 to the access position and lifts off from the seat, the pivoting seat portion 21 is returned automatically to the "drive" position. The return spring 80 is embodied as a torque spring having one end connected to the seat pan 34 and its other end connected to the pivot pin 33 or elsewhere on the pivoting seat cushion support frame 51. The needle thrust bearing and return spring minimize the friction between the seat pan and the seat cushion support frame and provide a smooth movement and proper seat stowage of the pivoting seat portion, after the occupant lifts off the seat, for door closure. A linear spring can be employed in place of the torque spring.

The pivot pin 33 is located below the pivoting seat portion near the outboard rear corner of vehicle seat assembly. Because the seat portion 21 pivots about a pivot axis 31 defined by a pivot member that is located beneath the portion of the seat that pivots, the pivoting seat portion moves with the seated occupant in the way the occupant typically egresses. The pivoting seat portion enhances this movement by translating the seated person further out over the rocker or sill 17 at the point of lift-off than if the occupant were to egress without the seat pivoting arrangement provided by the present invention. The seat pivot defines a pivot axis that is located to cause the front edge of the pivoting seat portion to be adjacent to and overlying the sill or rocker of the vehicle whereby the occupant's position is translated in a direction outboard of the vehicle.

Referring to FIGS. 7, 8 and 10, the guide rollers 23 and 24 are carried by the seat cushion support frame, arcuately spaced from one another. The guide roller 23 is located near the inboard rear corner of the seat cushion support frame and the guide roller 24 is located along the arcuate edge of the support frame 51 approximately midway between the rear inboard corner and the front outboard corner of the seat cushion support frame. The guide roller 23 is carried by a support 70 which includes a horizontally extending upper arm 71 and a horizontally extending lower arm 72 which straddle the raceway or guide track 40 as shown in FIG. 10. The guide roller 23 extends through an aperture 71a in the upper arm 71 and is rotationally mounted to the upper arm 71 by pin 73 with the lower surface of the guide roller engaging the upper surface of the guide track. The lower arm 72 extends below the raceway 40 and locates an adjustment mechanism 74, including a ball bearing 75, the position of which is adjustable by set screw 76 that is adapted to be turned in a tapped aperture 77 in the lower member 72. The set screw 76 is adjusted to cause the ball bearing 75 to engage the lower surface of the seat pan beneath the guide track, so that the guide roller 23 is maintained in engagement with the track. This arrangement prevents horizontal tipping of the cantilevered seat cushion support frame relative to the seat pan, thereby preventing tipping of the pivoting seat portion 21 relative to the fixed seat portion 20, as the pivoting seat portion 21 is pivoted between the drive and access positions.

The center lines of the guide rollers are disposed on a radius $r_1$ drawn from the pivot axis 31 of the pivot pin 33, which radius corresponds to the radius of the guide track. By way of example, the length of the radius $r_1$ is in the range of 14 to 18 inches, and in the exemplary embodiment is 14.5 inches. The guide roller 23 is spaced apart from guide roller 24 along the arcuate edge 64 of the seat cushion support frame a distance corresponding to the radius $r_1$ and the amount of travel of the pivoting seat portion from the normal use position to the access position. In the exemplary embodiment, the guide roller 23 is located 45 angular degrees from the guide roller 24. The vehicle seat assembly includes a travel limit provided by stop members 41 and 42 on the seat pan which cooperate with the support 70 for the guide roller 23 to limit the pivotal movement of the pivoting seat portion to a range of about 40° to 50°, and preferably to about 45 angular degrees from the normal use or drive position. The stop member 41 is engaged by the lower arm 72 when the pivoting seat portion 21 is at the drive position and the stop member 42 is engaged by the lower arm 72 when the pivoting seat portion 21 is at the access position. Thus, the stop members 41 and 42 define the amount of angular pivoting for the seat portion 21 between the normal use position and the access position.

Referring again to FIGS. 6 and 7, the detent notch 44a in the seat pan is sized to receive the guide roller 24 so that when the pivoting seat portion has been pivoted to the access position, the guide roller 24 drops into the notch. The depth of the notch is sufficient to maintain the pivoting seat portion in the access position as long as an individual is sitting in the seat, but the force of the restoring spring 80 is sufficient to cause the seat portion 21 to be returned to the drive position when the occupant lifts off of the seat.

Figure 11:
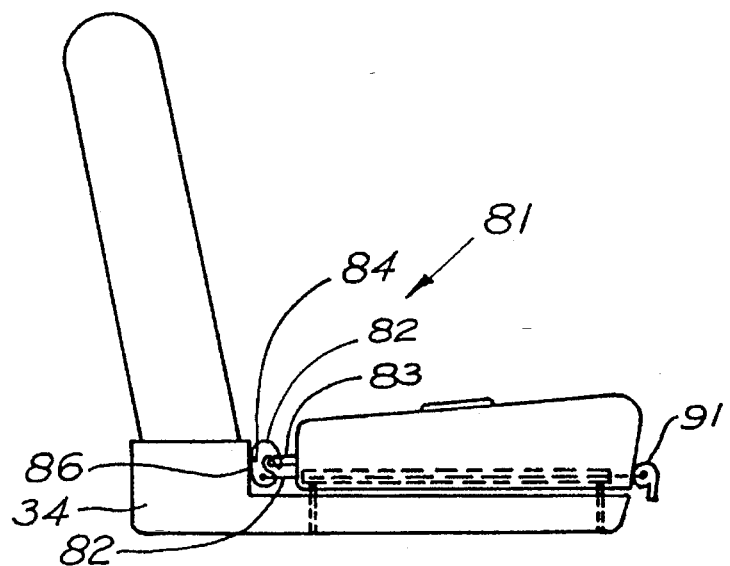
FIG. 11 is a side elevation view of the vehicle seat assembly illustrating the latch mechanism for the vehicle seat assembly for maintaining the pivoting seat portion in the normal use position.
Figure 12:
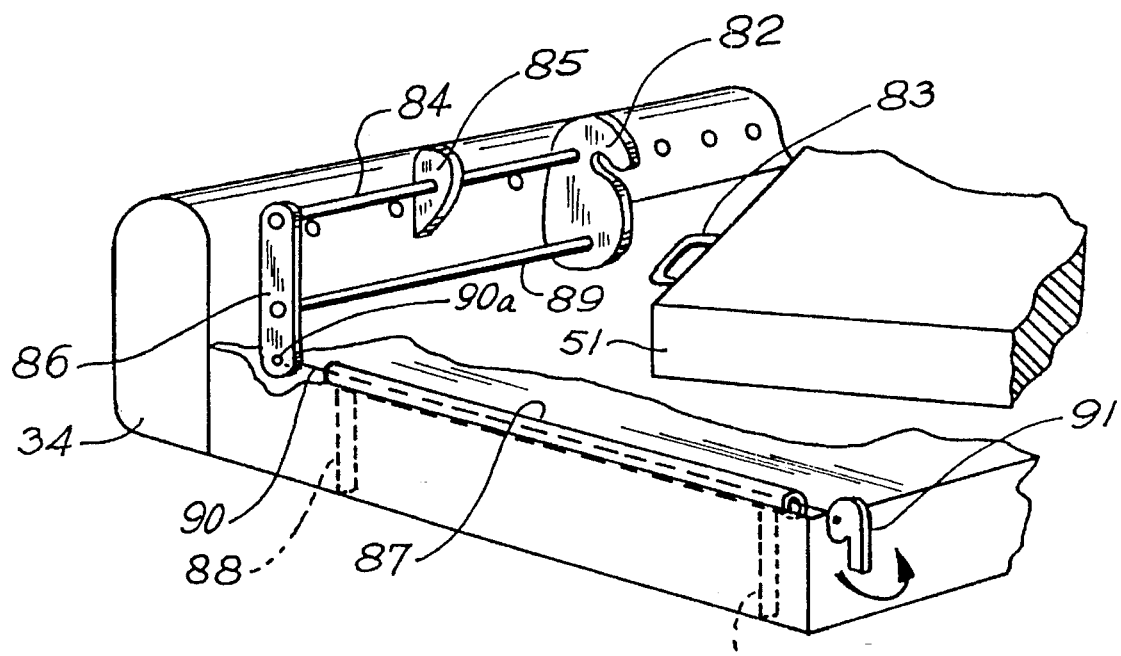
FIG. 12 is an enlarged perspective view of the latch mechanism for the vehicle seat assembly shown in FIG. 11.

Referring to FIGS. 11 and 12, the vehicle seat assembly includes a releasable latch mechanism 81 for maintaining the pivoting seat portion in the normal drive position. The latch mechanism 81 includes a hook 82 which cooperates with a latch bar 83 to lock the pivoting seat portion to the fixed seat portion. The hook is pivotally mounted on the fixed seat pan 34 by a pivot mechanism including a pivot rod 84 which defines a pivot axis for the hook 82. The hook is located inwardly of the inboard side of the seat pan 34 in operative relation with the latch bar 83 that is mounted on the frame 51 of the pivoting seat cushion near the inboard side thereof. The pivot rod 84 extends through one or more tabs 85 which project forwardly from the rear wall of the seat pan, the pivot rod having one end connected to the hook 82 and its other end connected to the upper end of a vertically extending actuating lever arm 86.

The latch mechanism 81 is operated by a release cable 90 which extends through a cable housing 87 supported on the seat pan by an pair of legs 88. A stabilizing rod 89 extends between the lever and the hook. The release cable 90 has one end 90a connected to the actuating lever arm 86 at its lower end and has its other end connected to a release lever 91 that is located at the front edge of the seat assembly. Raising the release lever draws the cable forwardly, pivoting the actuating lever arm in the direction of the arrow to pivot the rod moving the hook 82 to release the hook from the latch bar 83, permitting the pivoting seat portion to be pivoted from the drive position to the access position. The hook is restored to its latching engagement with the latch bar 83 when the pivoting seat cushion is restored to the drive position by spring 80.

Figure 13:
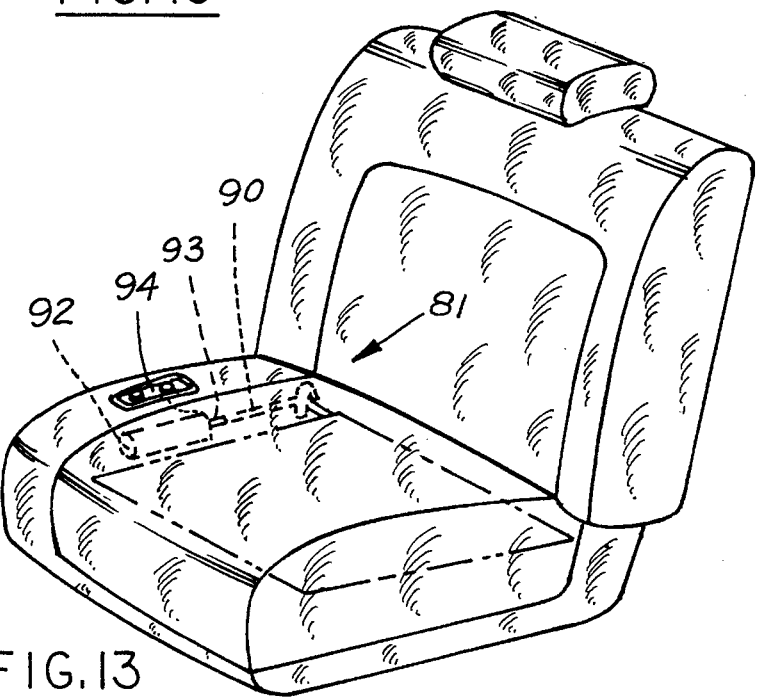
FIG. 13 is a front elevation view of a further embodiment for the latch mechanism of the vehicle seat assembly which includes an electrically controlled latch mechanism.

Referring to FIG. 13, in accordance with a further embodiment, the latch mechanism 81 is operated by a solenoid 92 mounted on the seat pan and having a plunger rod 93 connected to the cable 90. The solenoid 92 is energized by operating a switch 94 located along one side of the seat as illustrated in FIG. 13, or at the front of the seat, at a position that is convenient to an occupant of the seat assembly.

Figure 14:
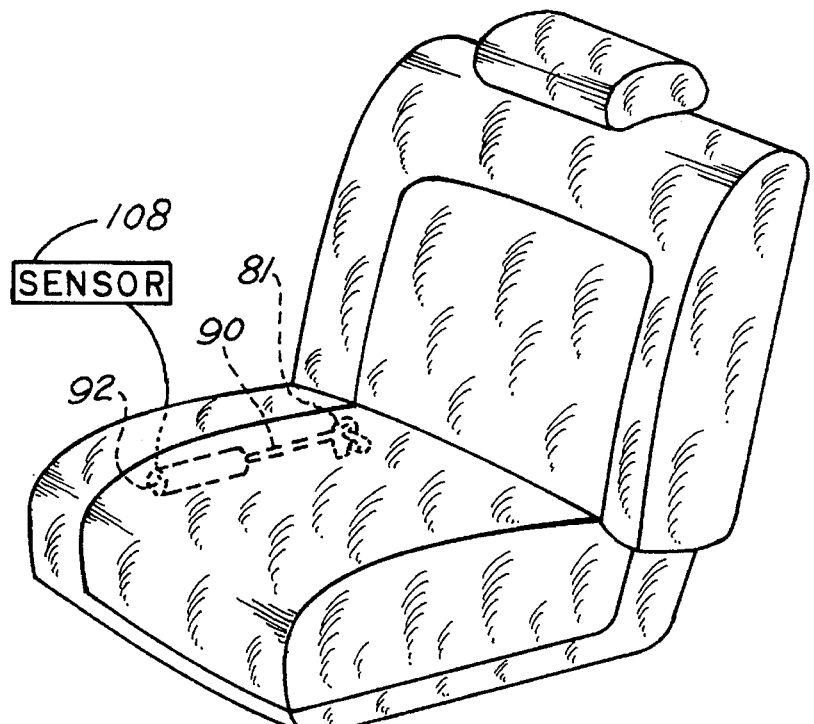
FIG. 14 is a front elevation view of a further embodiment for the latch mechanism of the vehicle seat assembly which includes an electrically controlled latch mechanism that is operated in response to the opening of the vehicle door.

Alternatively, the pivoting seat portion can be adapted to pivot from the drive position to the access position in response to the opening of the door of the vehicle rather than in response to the operation of a manual switch. In this alternative embodiment illustrated in FIG. 14, a return spring, such as return spring 80 (FIG. 7) is connected to cause the pivoting seat portion to pivot to the access position when released. A sensor 108 that is responsive to the opening of the door of the vehicle causes the solenoid 92 to be energized momentarily, unlatching the pivoting seat portion, permitting the pivoting seat portion to be pivoted to the access position under the force of the spring. The pivoting seat portion is latched in the drive position as the occupant returns the seat portion to the drive position by the occupant.

Figure 15:
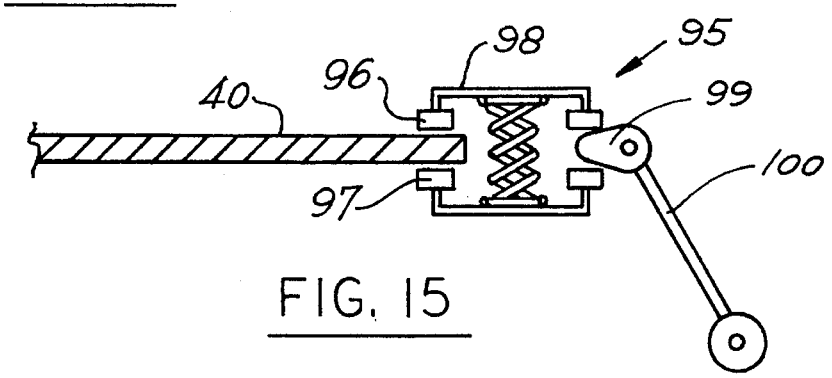
FIG. 15 is a view of the vehicle seat assembly illustrating another latch mechanism which includes a cam operated releaseable latch for maintaining the pivoting seat portion in any position between the normal use position and the access position.

Referring to FIG. 15, alternatively, a cam operated latch or locking mechanism 95 can be provided in place of the detent action provided by the guide wheel 24 and the notch 44. The cam operated locking mechanism 95 enables the user to control when the pivoting seat portion is free to pivot either under the force of a restoring spring or under the control of the occupant of the seat. The cam operated mechanism includes a pair of pads 96 and 97, one of the pads 96 is located in overlying relationship with the guide track 40 and the other pad 97 is located beneath the guide track.

The pads are carried on a yoke 98 which is spring loaded to maintain the pads out of contact with the track. The mechanism includes a cam 99 carried on a rod 100 which is rotatable clockwise to cause the cam to move the yoke so that the pads are driven into engagement with the track to hold the seat portion 21 in the position to which it has been pivoted. The cam operated mechanism permits the pivoting seat portion to be locked at any position at or between the drive and access positions. When the rod is rotated counterclockwise, the cam is operated to allow the spring loaded yoke to restore, moving the pads out of engagement with the track, permitting the occupant to pivot the seat portion 21 freely.

Figure 16:
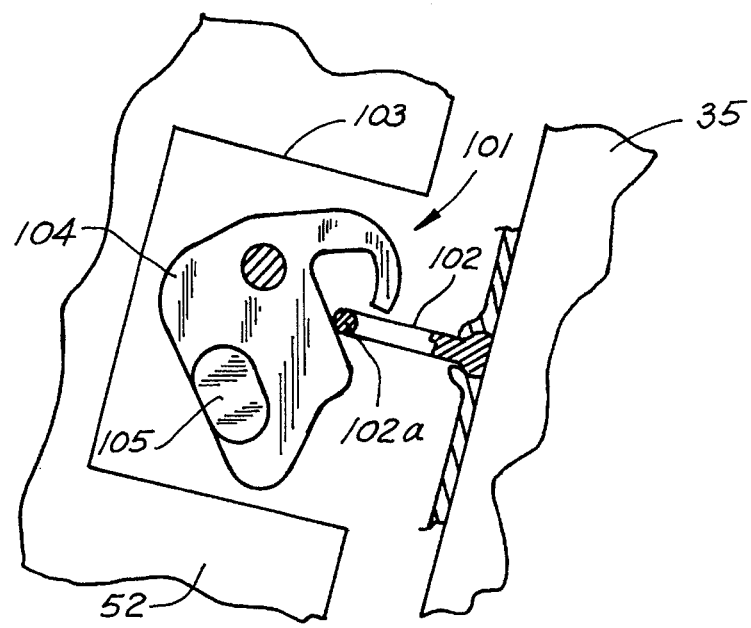
FIG. 16 is a fragmentary view of a portion of the vehicle seat assembly illustrating an embodiment for the latch mechanism that includes an inertia latch.

Referring to FIG. 16, in accordance with a further embodiment, the vehicle seat assembly includes an inertia latch 101 which is located near the rear inboard corner of the vehicle seat assembly. The inertia latch prevents movement of the pivoting seat portion 21 in response to a rapid deceleration as may occur in the event of a crash situation. Various inertia latches are known and accordingly, the inertia latch will not be described in detail. Briefly, the inertia latch includes a U-shaped member 102 which is mounted on the seat back frame 35 of the fixed seat portion 21 and a latching mechanism 103 which is carried by the seat back frame portion 52 of the pivoting seat portion 21. The member 102 is mounted near the lower inboard corner of the seat back frame and has a horizontally extending rod portion 102a. The latching mechanism 103 includes a pivotal lock member 104 which is mounted in juxtaposed relation with the member 102 and having a weight 105 pivotally mounted thereon, to cause the lock member to swing forwardly, pivoting clockwise in response to a rapid deceleration of the vehicle, causing the lock member 104 to engage the rod portion 102a of the member 102, preventing pivoting movement seat portion 21. One example of an inertia latch suitable for this purpose is disclosed in U.S. Pat. No. 4,988,134, which was issued on Jan. 29, 1991.

Figure 17:
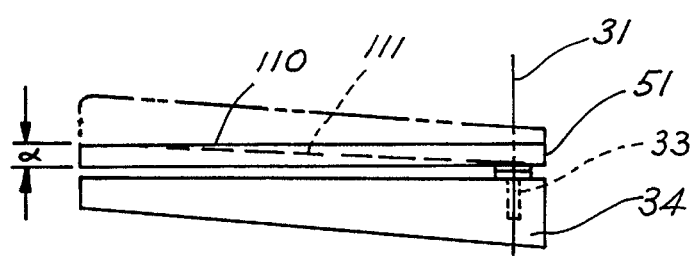
FIG. 17 is a simplified side view of the vehicle seat assembly illustrating the plane of separation between the frames of the fixed and pivoting seat portions of the vehicle seat assembly.

Referring to FIG. 17, the separation plane between the seat pan 34 and the seat cushion support frame 51 extends at an angle $\alpha$ relative to the horizontal which is in the range of 0° to 10°. Preferably, the angle $\alpha$ is 0° so that the separation plane extends horizontally as shown by the solid line 110 in FIG. 17. For such condition, the pivot axis 31 defined by the pivot pin 33 is substantially vertical so that raking is minimized as the seat portion 21 is pivoted between the drive and access positions. As a result, an individual will not experience imbalance due to the fore to aft inclination of the seat, particularly during ingress into the vehicle. However, vehicle seats incline from front to back, and so the plane of separation extends at a slight angle $\alpha$ relative to the horizontal as represented by the dashed line 111 in FIG. 17. The angle $\alpha$ is no greater than about 10° and preferably, is in the order of 7°.

Figure 18:
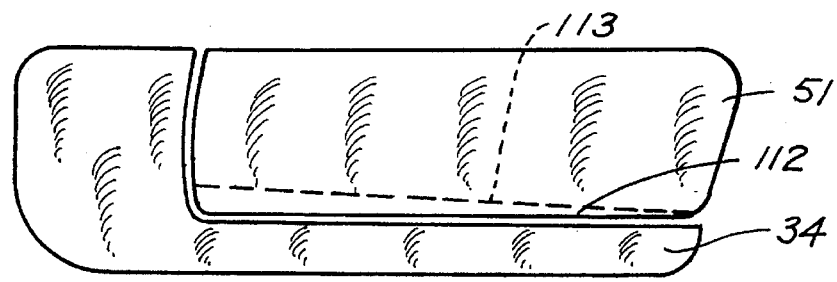
FIG. 18 is a simplified front view of the vehicle seat assembly illustrating the plane of separation between the frames of the fixed and pivoting seat portions of the vehicle seat assembly.

Referring to FIG. 18, the plane of separation between the seat pan 34 and the seat cushion support frame 51 can be angled laterally. As viewed from the front of the seat assembly as illustrated in FIG. 18, preferably, the lateral extent of the seat cushion support frame is parallel to the lower seat frame as represented by the solid line 112 in FIG. 18. However, the plane of separation of the seat may be inclined outwardly in a lateral direction as represented by the dashed line 113 in FIG. 18.

Figure 19:
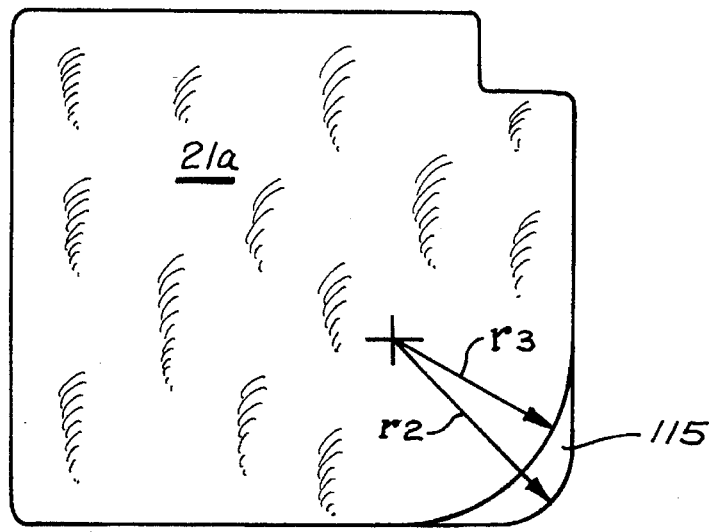
FIG. 19 is a top plan view illustrating the arcuate forward outboard corner of the seat cushion of the pivoting seat portion.

Referring to FIG. 19, preferably the forward outboard corner 115 of the seat cushion 21a is severely rounded to provide more leg room for an individual during the pivoting movement of the seat portion 21 between the drive and access positions. By way of example, for a seat cushion 21a that is approximately twenty inches wide and twenty inches deep from front to back, the corner is shown as being cut at a radius $r_2$ of ten inches, for example. The outer seat corner may have a greater or more severe cut, such as, for example, the five inch radius $r_3$ as shown by the dashed line in FIG. 19. Moreover, in some applications the front outboard edge may have a substantially small radius.

Referring to FIG. 20, there is illustrated a further embodiment of a vehicle seat assembly 118 in which the entire seat back 14 of the vehicle seat assembly 118 is fixed and only a portion 21 a of the seat cushion 12 is movable relative to the rest of the vehicle seat assembly. In this embodiment, the portion 21a of the seat cushion that provides support for the occupant of the seat, is mounted on a pair of slide rail assemblies 119, which are provided in addition to the conventional slide rail assemblies 25 which provide for fore and aft movement of the seat assembly, for permitting the seat cushion portion 21a to be moved laterally relative to the remainder of the vehicle seat assembly to translate the occupant laterally towards the outboard side of the vehicle. The vehicle seat assembly 118 includes a latch mechanism 81 corresponding to that for the vehicle seat assembly 10 for preventing the sliding seat portion from moving laterally relative to the fixed seat portion except during ingress or egress.

Referring to FIGS. 21–24, there is illustrated another embodiment of a vehicle seat assembly 120 that includes a reclineable seat back 14. The seat back 14 is connected to the seat cushion 12 by a conventional recliner mechanism 31 which permits the inclination of the seat back to be adjusted relative to the seat cushion as is known in the art. In this embodiment, only the portion 21a of the seat cushion that provides support for the occupant of the seat is adapted to pivot relative to the remainder of the seat assembly. That is, the seat back portion of the vehicle seat assembly does not move with the seat cushion portion 21a during an individual's ingress into of egress out of the vehicle.

The seat assembly 120 includes a pivot assembly 122 and a guide assembly. The pivot assembly 122 includes a "doughnut" shaped thrust bearing 123 which supports the pivoting seat cushion portion at its rear outboard corner and provides the function of the pivot pin. The upper portion of the bearing is attached to the under surface of the frame 51 of the pivoting seat portion. The lower portion of the bearing is secured to the upper surface of the seat pan 124. The thrust bearing 123 has a 4 inch inner diameter and a 5.5 inch outer diameter. A thrust bearing suitable for this application is commercially available as the series 29400 from INVET-ECH.

Referring to FIG. 22, the outboard upright member 125 of the seat back frame extends upwards through the aperture 126 defined by the inner diameter of the thrust bearing. The seat pan 124 has an aperture 128 at its inboard rear corner through which passes the inboard upright member 129 of the seat back. The thrust bearing provides sufficient clearance to permit the seat portion to pivot about a vertical axis, i.e., about the recliner bracket, between a normal use or drive position, illustrated in FIG. 23, and an access position, illustrated in FIG. 24. The thrust bearing configuration also permits the recliner bracket to rotate about a horizontal axis as the angle of inclination of the seat back is adjusted.

The guide assembly includes guide rollers, such as guide roller 24 shown in FIG. 21, a guide roller corresponding to guide roller 25 (FIG. 7), and a guide track 40 which correspond to like numbered elements of vehicle seat assembly 10. The forward edge of the pivoting seat portion 21a is supported and guided by the guide rollers which stabilize the pivoting seat portion.

The vehicle seat assembly 120 includes one or more latch mechanisms which are similar to those for the vehicle seat assembly 10 for preventing the pivoting seat portion from pivoting relative to the fixed seat portion except during ingress or egress.

Figure 25:
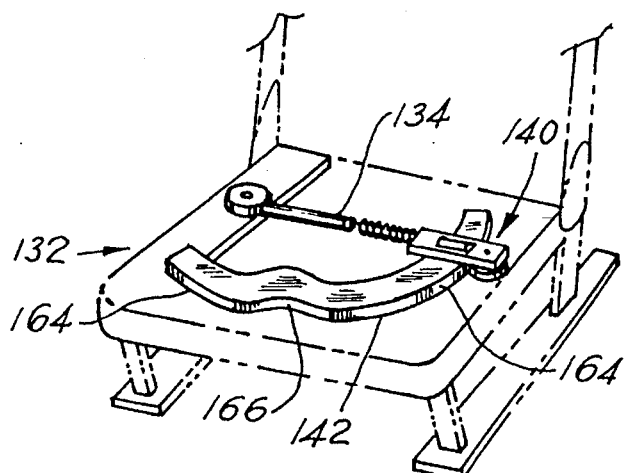
FIG. 25 is a perspective view of a further embodiment for a pivot mechanism for a vehicle seat assembly.
Figure 27:
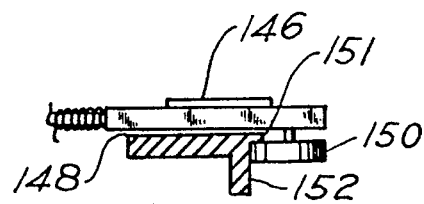
FIG. 27 is a view taken in the direction of the arrows 27—27 in FIG. 26.
Figure 26:
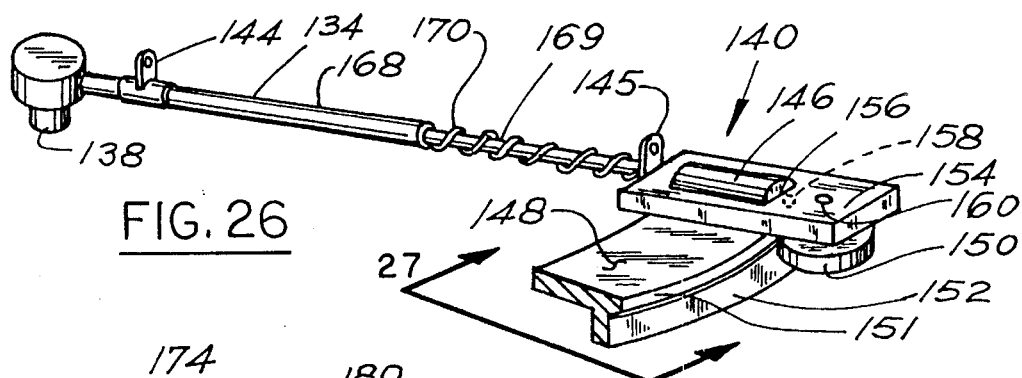
FIG. 26 is an enlarged view of the pivot arm, the guide rollers and a portion of the guide track of the pivot mechanism shown in FIG. 25.

Referring to FIGS. 25–27, there is illustrated a pivoting seat assembly 132 which includes an articulated pivot arm 134. The articulated pivot arm 134 causes the pivoting seat portion to be moved backwards as it is being pivoted toward the outboard side of the vehicle. The pivot arm 134 includes a pivot pin 138 at one end for pivotally mounting the assembly on the seat pan and a guide roller assembly 140 at the other end which cooperates with a guide track 142 on the seat pan to define the path of movement of the pivoting seat portion 21a.

The pivoting seat portion 21a is attached to the pivot arm 134 by mounting brackets 144 and 145 carried on the upper surface of the pivot arm. One of the mounting brackets 144 is fixed on the outer section 169 of the pivot arm and the other mounting bracket 145 is slidably mounted on the inner section 168 of the pivot arm. The guide roller assembly includes a guide roller bearing 146 rotatable about a horizontal axis which cooperates with a horizontally extending portion 148 of the guide track and a cam roller bearing 150 rotatable about a vertical axis which cooperates with a vertically extending portion 152 of the guide track. The two roller bearings are carried on a plate 154 mounted on the end of the pivot arm. The roller bearing 146 is mounted in an aperture 156 in the plate by a pivot pin 158. The cam roller bearing 150 is mounted to the plate 154 by a pivot pin 160 is secured to the plate for pivoting movement relative thereto.

The guide track portion 148 on the guide track is a horizontal surface on the upper surface of the seat pan. The guide track portion 152 is a contoured surface on the edge of the track. The guide track is generally arcuate at its ends 164, but has an inwardly directed portion 166 intermediate its ends, defining a contoured surface portion for the guide track. The guide track portion may be formed to define a desired contour or the guide track may be at a fixed radius and include a cam located along the radius to adapt the guide track to provide a desired contour.

The outer section 169 of the pivot arm 134 extends in a telescoping relationship with the inner section 168 of the pivot arm 134. The pivot arm 134 extends outwardly in cantilever fashion from the pivot 138. A tension spring 170 which is interposed between the two sections 168 and 169 of the pivot arm provides an inwardly directed bias force for biasing the outer section 169 into engagement with the contoured vertical surface of the guide track. The outer section 169 is adapted to be moved radially inwardly when the guide cam roller bearing is rolling over the contoured portion of the guide track. Referring to FIG. 27, the guide roller 146 engages the flat upper surface 148 of the track. The outer cam roller bearing 150 underlies an outwardly projecting portion 151 of the guide track and engages the vertical surface 152. Alternatively, the guide roller assembly may comprise a ball bearing which provides the horizontal and vertical engagement of the end of the pivot arm with the guide track.

The pivot mechanism moves the moveable seat portion rearwardly when cam guide roller 150 moves from the end portion 164 and engages the contoured surface portion 166, and then forwardly when the guide roller 177 moves into engagement with the other arcuate end portion 164 of the guide track, when the moveable seat-portion is being moved from the normal use position to the access position in which it is located with its forward edge overlying the sill, closely approximating a normal egress from the vehicle.

Figure 28:
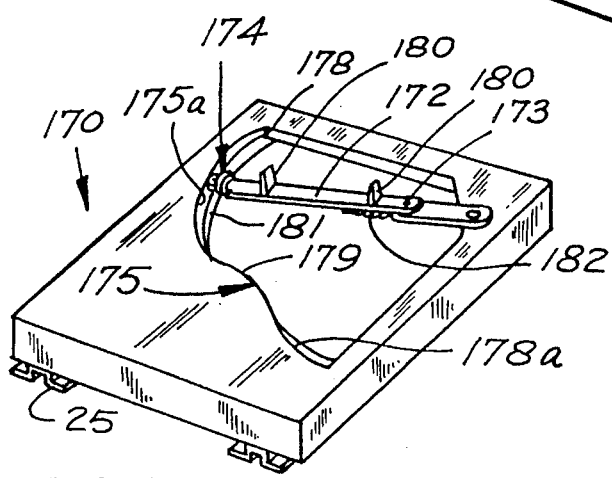
FIG. 28 illustrates an alternative pivot mechanism including an articulated pivot arm.

Referring to FIG. 28 in an alternative arrangement for a pivot mechanism 170, the pivot arm 172 has a floating pivot 173 which is located radially outward from the pivot axis. A guide roller assembly 174 is attached to the end of the pivot arm 172 in cooperative relation with a guide track 175. The guide roller assembly 174 includes a guide roller 176 which rotates about a horizontal axis and a guide roller 177 which rotates about a vertical axis. The guide track has an arcuate start portion 178, a contoured portion 179 and an arcuate end portion 178a along its inner edge 175a and a flat upper surface 181. The contoured portion 179 has a radius of curvature that is different from that for the arcuate portions 178 and 178a. The pivot arm 172 carries a pair of mounting brackets 180 to facilitate attachment of the frame of the pivoting seat portion to the pivot arm.

Figure 29:
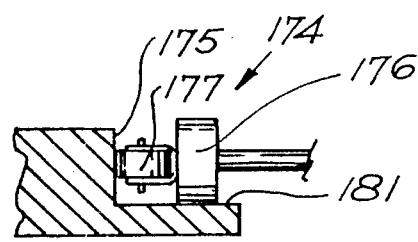
FIG. 29 is an enlarged fragmentary view illustrating the relationship between the guide rollers and the guide track.

As shown in FIG. 29, the guide roller 176 engages the flat upper surface 181 of the guide track in the manner of the guide rollers 23 and 24. The guide roller 177 engages the contoured inner surface of the guide track. The pivot arm assembly includes a spring 182 which biases the telescoped sections outwardly so as to bias the guide roller into engagement with the vertical portion of the guide track.

The pivot mechanism 170 moves the moveable seat portion rearwardly when cam guide roller 177 moves from the arcuate start portion 178 and engages the contoured portion 179, and then forwardly when the guide roller 177 moves into engagement with the arcuate end portion 178a of the guide track in the manner of the pivoting seat assembly 132, as the moveable seat portion is being moved from the normal use position to the access position in which it is located with its forward edge overlying the sill.

In accordance with another aspect of the invention, the vehicle seat assemblies 10, 10', 118, and 120 are supplemented by one or more hand grips, resulting in a system that facilitates the ingress by an individual into and egress out of a vehicle through a door opening of the vehicle. The hand grip is disposed on a portion of the vehicle adjacent to the door opening and located to be gripped by an individual during ingress into and/or egress from the vehicle.

Figure 31:
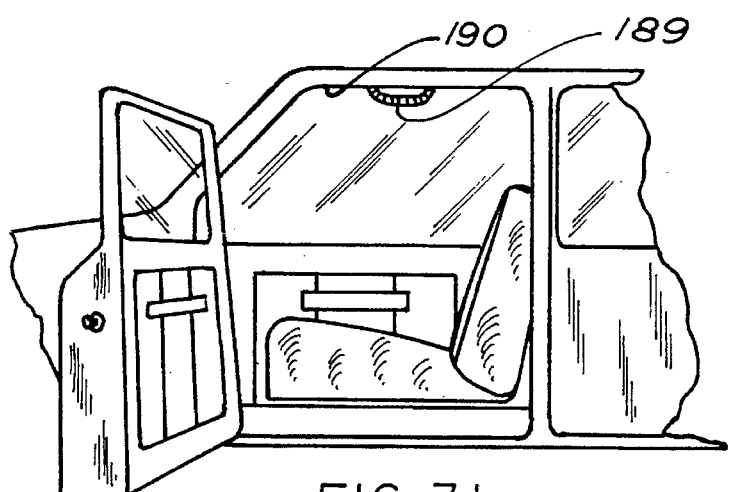
FIG. 31 illustrates a headliner mounted hand grip for use by an occupant during ingress into and/or egress from the vehicle.
Figure 30:
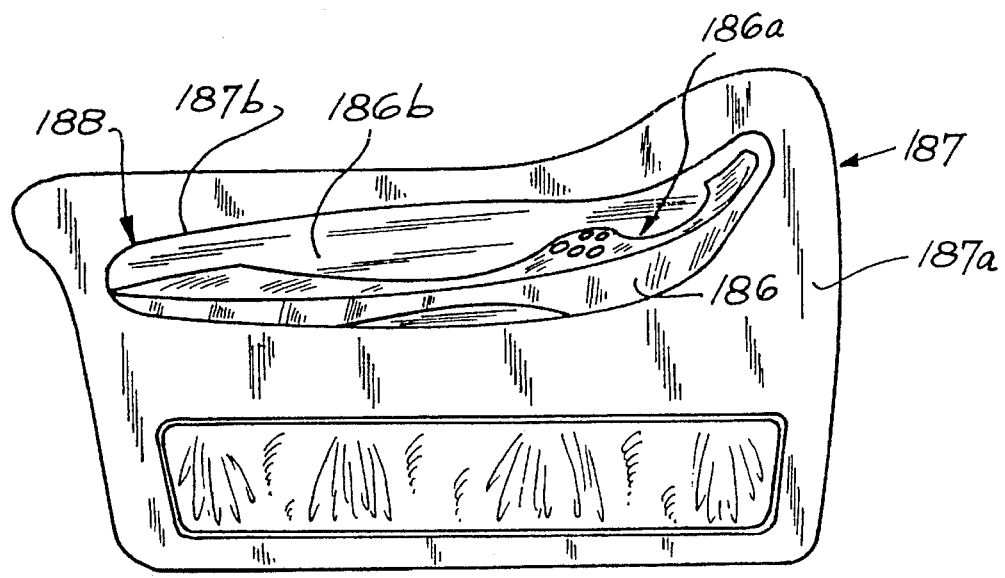
FIG. 30 illustrates a door mounted hand grip for use by an occupant during ingress into and/or egress from the vehicle.

Referring to FIG. 30, in one embodiment, the hand grip 186 is located on the inside surface 187a of the door 187 and extends substantially the entire length of the door. The hand grip includes a recess 186a near the forward end of the hand grip and an elongated opening 186b extending from near the center of the hand grip to a point adjacent to the rear of the hand grip. The hand grip 186 is produced in the form a replaceable panel 188 that is secured to an opening 187b in the inner surface 187a of the door 187. This permits the hand grip 186 to be marketed as a part of a trim package with its styling, colors and contours complementing the interior trim of the vehicle in which it is installed. In the embodiment illustrated in FIG. 31, the hand grip 189 is formed with the headliner 190 of the vehicle and extends inwardly at the top center portion of the frame around the doorway.

Figure 32:
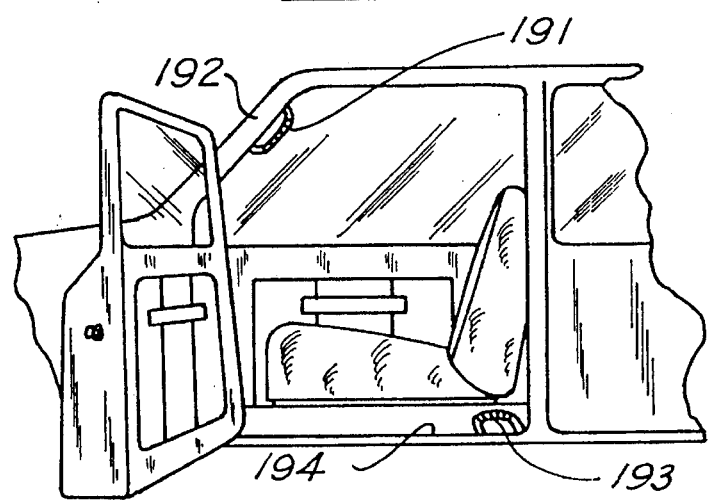
FIG. 32 illustrates a portion of a vehicle frame including a hand grip located on an "A" pillar of the vehicle and a hand grip located on the rocker of the vehicle for use by an occupant during ingress into and/or egress from the vehicle.
Figure 33:
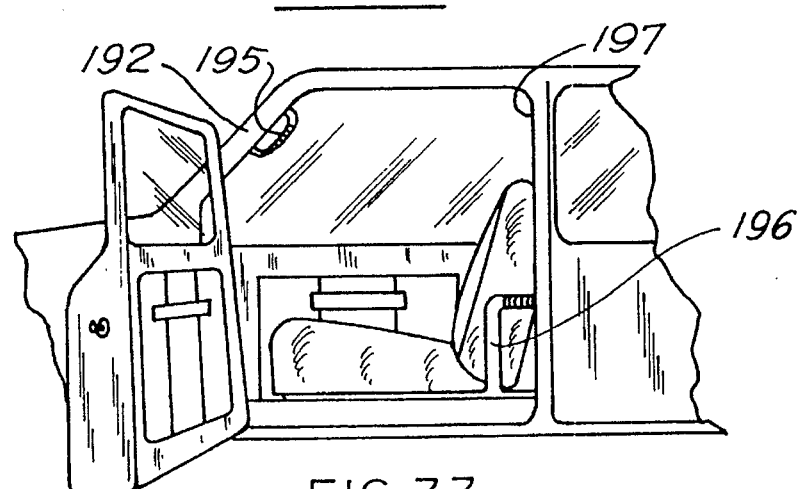
FIG. 33 illustrates an embodiment for a vehicle frame including a hand grip located on an "A" pillar of the vehicle and a hand grip located on the "B" pillar of the vehicle for use by the occupant during ingress into and/or egress from the vehicle.

In FIG. 32, the vehicle frame includes a hand grip 191 located on an "A" pillar 192 of the vehicle near the top or upper left corner of the door opening and a hand grip 193 located on the rocker 194 of the vehicle near the bottom or lower right corner of the door opening at a point that is substantially diametrically opposed to handle. The vehicle frame includes a portion defining an arched or arcuately shaped door opening for permitting ingress into and egress from the vehicle. In FIG. 33, the vehicle frame includes a hand grip 195 located on an "A" pillar 192 of the vehicle and a handle or hand grip 196 that is located on an "B" pillar 197 of the vehicle.

Figure 34:
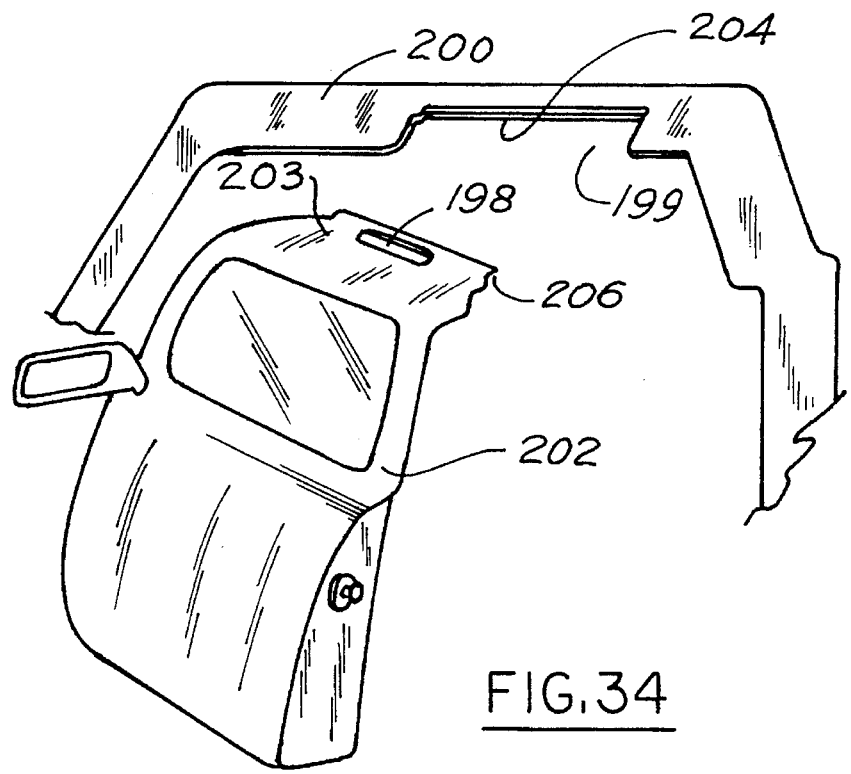
FIG. 34 illustrates a portion of a vehicle the roof of which has a cutout portion adjacent to a door opening for facilitating ingress into and/or egress from a vehicle by the occupant; and, FIG. 35 is a view of a bench seat having pivoting seat portions in accordance with the present invention.

Referring to FIG. 34, the hand compatible grip 198 is defined by a portion 199 of the roof 200 of the vehicle and the upper portion 201 of the door 202 of the vehicle. As shown in FIG. 34, the roof 200 of the vehicle has a cut out portion 199 just above the door 202 to facilitate ingress into and egress from the vehicle. The door has an extension portion 203 that is complementary in shape to the cut out portion 199 of the roof and which is received in the cut out portion. The door extension portion 203 defines a hand grip 198 when the door is open, the hand grip 198 being concealed when the door is closed. The roof is under cut as at 204 and the upper edge 206 of the door extension portion has a portion of a reduced thickness to mate with the roof portion, providing sealing. Alternatively, the hand grip may be defined in the roof of the vehicle and concealed by the extension portion 203 of the door, when the door is closed.

Figure 35:
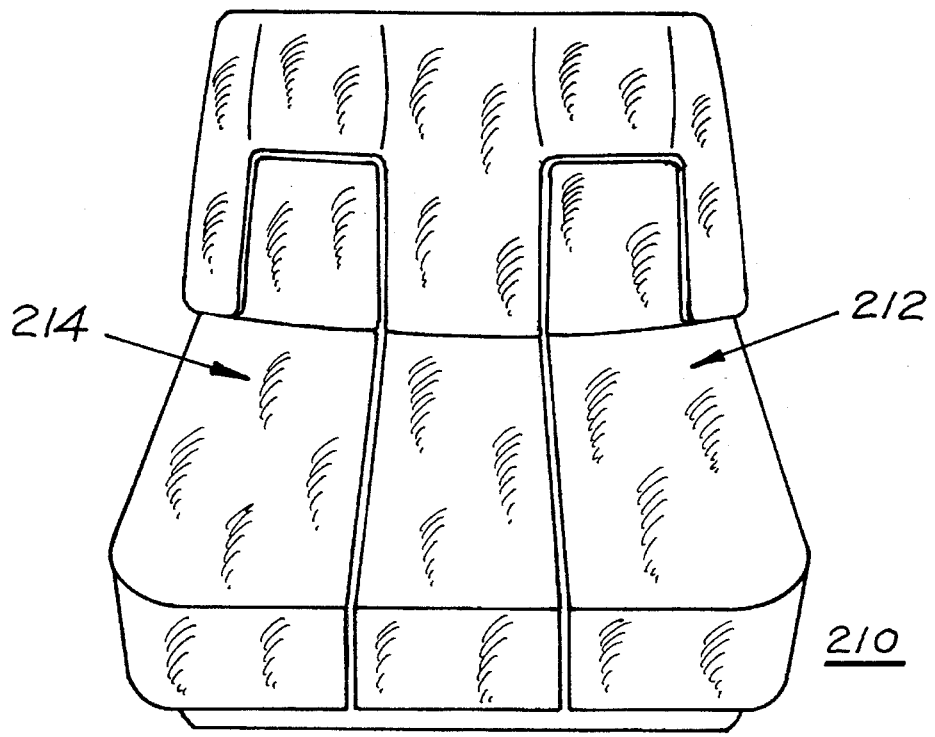

Referring to FIG. 35, the pivoting seat arrangement according to the present invention is shown applied to a bench seat 210. The bench seat 210 has a pivoting seat portion 212 at the left of driver's side of the vehicle, and a pivoting seat portion 214 at the right or passenger side of the vehicle. The bench seat 210 may be the front seat of the vehicle or the rear seat of a four door vehicle, or such bench seat may be provided in both the front and back of the vehicle. The pivot mechanisms are located below the pivoting seat portion and near the outboard rear corner as described above for seat assembly 10. Each of the pivoting seat portions 212 and 214 of the bench seat assembly includes the features of the seat assembly 10 or 10' as has been described.

Thus, it has been shown that the present invention provides a vehicle seat assembly in which a portion of the seat cushion is adapted to be moved relative to the remainder of the seat cushion from a normal use position to an access position where at least a portion of an edge of the seat cushion portion overlies the rocker of the vehicle to facilitate ingress into and egress from the vehicle. In one embodiment, the movable seat portion is adapted to pivot relative to the fixed seat portion between the normal use or drive position and the access position. The pivot axis is located beneath the pivoting seat portion and the movable portion of the seat pivots in a substantially horizontal plane and over a limited range in the order of 40° to 50° so that the pivoting movement of the pivoting seat portion from the drive position to the access position corresponds to the movement of an individual during normal egress from the vehicle. The location of the pivot axis beneath the pivoting seat portion, the limited range of movement together and the fact that only part of the seat cushion pivots, makes the pivoting seat cushion arrangement provided by the present invention simpler in construction and considerably less expensive than known arrangements. In another embodiment, the seat assembly includes a slide track that permits a portion of the seat to be moved laterally relative to the remainder of the seat between the normal use and access positions. In accordance with another aspect of the invention, a vehicle seat assembly including the pivoting seat cushion arrangement is supplemented by one or more hand grips, resulting in a system that facilitates an individual's ingress into and egress out of a vehicle through a door opening of the vehicle. The hand grip is disposed on a portion of the vehicle adjacent to the door opening and is located to be gripped by an individual during ingress into and/or egress from the vehicle. In one embodiment, the hand grip is defined by the outboard side of the fixed seat portion or the inner surface of the door of the vehicle. In other embodiments, the hand grip is an integral part of the frame of the vehicle and may be formed as part of the "A" pillar and/or the "B" pillar of the vehicle, the rocker of the vehicle or may be defined by mating portions of the roof and door of the vehicle.

While the invention has been described with reference to preferred embodiments, various modifications can be made without departing from the spirit and scope of the invention as defined in the appended claims. For example, the seat cushion support frame can be a seat pan similar to the seat pan of the fixed seat portion and the two seat pans can be adapted to nest together to provide a locking function for preventing unwanted pivoting of the pivoting seat portion. Also, the vehicle seat assembly may include a reclineable seat back that is connected to the seat cushion by a recliner mechanism which extends through the pivot mechanism and provides clearance to permit the seat back to pivot relative to the seat cushion or only a portion of the seat back may be adapted to pivot with the seat cushion. In such seat assembly, the seat back frame of the pivoting seat portion would be adapted to nest in and be secured to the back seat frame of the fixed seat portion with the pivoting seat back frame and would include a recliner mechanism that couples to the recliner mechanism of the fixed seat portion and that breaks away or decouples when the pivot mechanism is activated.

We claim:

1. A vehicle seat assembly having front and rear inboard corners and front and rear outboard corners, comprising:

a seat cushion and a seat back mounted on and aligned with said seat cushion, said seat cushion including first and second seat portions, said first seat portion including first cushion material defining a fixed partial seat cushion section providing partial support for an occupant of the vehicle seat assembly;

said second seat portion including second cushion material defining a pivoting partial seat cushion section providing partial support for an occupant of the vehicle seat assembly;

mounting means for mounting said second seat portion on said first seat portion for movement relative to said first seat portion, said mounting means including pivot means extending downwardly from said second seat portion near the outboard rear corner of the vehicle seat assembly defining a substantially vertical pivot axis for permitting said second seat portion to pivot relative to said first seat portion about said pivot axis in a substantially horizontal plane between a forward facing use position and an access position where at least a portion of one edge of said second seat portion overlies the rocker of the vehicle to facilitate ingress into and egress from the vehicle through a doorway of the vehicle;

said pivoting partial seat cushion section being adapted to nest with said fixed partial seat cushion section when said second seat portion is in said use position, whereby said fixed and pivoting partial seat cushion sections provide the appearance of a whole seat cushion for the vehicle seat assembly when said second seat portion is in said use position;

and wherein said seat back includes third cushion material which defines a fixed partial seat back section of the vehicle seat assembly having a recessed cutout area and fourth cushion material which defines a pivoting partial seat back section of the vehicle seat assembly, said pivoting partial seat back section being mounted on and movable with said pivoting partial seat cushion section between said use and access positions, said second partial seat back section being received in said recessed cutout area of said fixed partial seat back section and being adapted to nest with said fixed partial seat back section when said second seat portion is in said use position, whereby said first and second partial seat back sections provide the appearance of a whole seat back cushion for the vehicle seat assembly.

2. The vehicle seat assembly according to claim 1, including releasable latch means for maintaining said second seat portion in at least one of said positions, release means for releasing said latch means to permit said second seat portion to be moved from said one position to the other one of said positions, and bias means for urging said second seat portion toward said other one of said positions.

3. The vehicle seat assembly according to claim 1, including restoring means for moving said second seat portion from one of said use and access positions to the other one of said use and access positions.

4. The vehicle seat assembly according to claim 1, wherein said second seat portion has a front corner portion at said front outboard corner having a radius of curvature that is less than about ten inches to provide increased leg room for an occupant of the vehicle seat assembly during the pivoting movement of said second seat portion between said use and access positions.

5. The vehicle seat assembly according to claim 1, wherein said vehicle seat assembly has front and rear inboard corners and front and rear outboard corners, and wherein said seat back has a shoulder formed in an upwardly extending side portion at said rear outboard corner defining a push off shoulder that is located to be reached and gripped by an occupant of the vehicle seat assembly during egress from the vehicle.

6. A vehicle seat assembly comprising:

a first seat portion including first cushion material defining a first partial seat cushion section of the vehicle seat assembly;

a second seat portion including second cushion material defining a second partial seat cushion section of the vehicle seat assembly;

said second seat portion being mounted on said first seat portion and adapted for movement relative to said first seat portion, between a use position and an access position where at least a portion of one edge of said second seat portion overlies the rocker of the vehicle to facilitate ingress into and egress from the vehicle said second partial seat cushion section being adapted to nest with said fixed partial seat cushion section when said second seat portion is in said use position, whereby said first and second partial seat cushion sections provide the appearance of a whole seat cushion for the vehicle seat assembly when said second seat portion is in said use position, said first seat portion includes third cushion material which defines a first partial seat back section of the vehicle seat assembly, and said second seat portion includes fourth cushion material which defines a second partial seat back section of the vehicle seat assembly, said second partial seat back section being adapted to nest with said first partial seat back section when said second seat portion is in said use position whereby said first and second partial seat back sections provide the appearance of a whole seat back cushion for the vehicle seat assembly, said third cushion material including first and second vertically extending portions which define the inboard and outboard sides of the seat back cushion of the vehicle seat assembly and a third portion extending horizontally between upper ends of said first and second portions and which defines the upper middle portion of the seat back cushion of the vehicle seat assembly.

7. A vehicle seat assembly having front and rear inboard corners and front and rear outboard corners, said vehicle seat assembly comprising:

a seat cushion and a seat back mounted on and aligned with said seat cushion, said seat cushion including first and second seat portions, said first seat portion including first cushion material defining a fixed partial seat cushion section providing partial support for an occupant of the vehicle seat assembly;

said second seat portion including second cushion material defining a pivoting partial seat cushion section providing partial support for an occupant of the vehicle seat assembly;

mounting means for mounting said second seat portion on said first seat portion for movement relative to said first seat portion, said mounting means including pivot means extending downwardly from said second seat portion near the outboard rear corner of the vehicle seat assembly, defining a substantially vertical pivot axis for permitting said second seat portion to pivot relative to said first seat portion about said pivot axis in a substantially horizontal plane between a forward facing use position and an access position where at least a portion of one edge of said second seat portion overlies the rocker of the vehicle to facilitate ingress into and egress from the vehicle through a doorway of the vehicle;

first and second guide rollers carried by said second seat portion, and an arcuate guide track defined by said first seat portion for said guide rollers, said guide track extending from a first location on said first seat portion near said rear inboard corner to a second location on said first seat portion near said front outboard corner, said first seat portion having a raised portion which defines a fixed guide adjacent to said second location for providing a smooth glide surface for said pivoting seat portion at said second location, means mounting said first guide roller on said second seat portion near said rear inboard corner for turning movement about a generally horizontal axis and in rolling engagement with said guide track, and means mounting said second guide roller on said second seat portion at a location spaced approximately 45° from said first guide roller for turning movement about said horizontal axis and in rolling engagement with said guide track, said pivoting partial seat cushion section being adapted to nest with said fixed partial seat cushion section when said second seat portion is in said use position, whereby said fixed and pivoting partial seat cushion sections provide the appearance of a whole seat cushion for the vehicle seat assembly when said second seat portion is in said use position.

8. A vehicle seat assembly having front and rear inboard corners and front and rear outboard corners, said vehicle seat assembly comprising:

a seat cushion and a seat back mounted on and aligned with said seat cushion, said seat cushion including first and second seat portions, said seat cushion including a first seat portion and a second seat portion, said first seat portion being adapted to be mounted on the floor of the vehicle and including adjustment means for providing at least fore and aft adjustment for the vehicle seat assembly, said first seat portion including first cushion material defining a fixed partial seat cushion section providing partial seat cushion support for an occupant of the vehicle seat assembly;

and said second seat portion including second cushing material defining a pivoting partial seat cushion section providing partial seat cushion support for an occupant of the vehicle seat assembly, said seat back including a first seat back cushion portion including third cushion material defining a fixed partial seat back cushion section which together with said fixed partial seat cushion section defines a fixed seat portion of the vehicle seat assembly, and a second seat back cushion portion defining a pivoting partial seat back cushion section which together with said pivoting partial seat cushion section defines a pivoting seat portion of the vehicle seat assembly;

and mounting means mounting said pivoting seat portion on said fixed seat portion, said mounting means including a pivot member carried by one of said seat portions near said rear outboard corner of said vehicle seat assembly and a receptacle on the other one of said seat portions for receiving said pivot member, said pivot member defining a substantially vertical pivot axis for permitting said pivoting seat portion to pivot relative to said fixed seat portion in a substantially horizontal plane between a use position and an access position, whereby the pivoting movement of said pivoting seat portion about said pivot axis from said normal use position to said access position corresponds substantially to the movement of an individual during normal egress from the vehicle, and guide means for providing guided movement for said pivoting seat portion relative to said fixed seat portion between said use and access positions, said guide means including at least first and second guide rollers carried by one of said seat portions, and an arcuately shaped guide roller track defined by the other one of said seat portions, said guide roller track extending from a location adjacent to the front outboard corner of said seat assembly to a location adjacent to the rear inboard corner of said seat assembly.

9. The vehicle seat assembly according to claim 8, wherein said fixed seat portion includes a first frame having an upper surface defining said arcuate guide track, and wherein said pivoting seat portion includes a second frame having a surface opposing said upper surface of said first frame, said pivot member connecting said second frame to said first frame near said rear outboard corner, said first and second guide rollers being mounted to said second frame and being interposed between said second frame and said first frame for providing guided movement for said pivoting seat portion along said upper surface of said first frame, said first frame having a raised portion on said upper surface near said front outboard corner, defining a guide which serves as a bearing surface for surface of said seat frame of said pivoting seat portion near said front outboard corner to provide a smooth glide surface for the front of said pivoting seat portion.

10. The vehicle seat assembly according to claim 9, including means mounting said first and second guide rollers on said second frame for turning movement about a generally horizontal axis and in rolling engagement with said arcuate guide track.

11. The vehicle seat assembly according to claim 9, including travel limit means cooperating with at least one of the said guide rollers to limit the pivotal movement of said pivoting seat portion to a predetermined range.

12. The vehicle seat assembly according to claim 11, wherein said travel limit means limits pivoting of said pivoting seat portion to about 45° from said use portion.

13. The vehicle seat assembly according to claim 9, wherein the plane of separation between said first and second frames extends at an angle relative to the horizontal, said angle being in the range of about 0° to 10°.

14. The vehicle seat assembly according to claim 9, wherein said upper surface of said first frame has a detent notch near said front forward corner for receiving said second guide roller to maintain said pivoting seat portion at said access position at least as long as the occupant remains in the vehicle seat assembly.

15. The vehicle seat assembly according to claim 8, including manually operable locking means for locking said pivoting seat portion in a plurality of positions between said use position and said access position, said locking means including first and second pads, support means for supporting said first pad in overlying relationship with said upper surface of said guide track and supporting said second pad in underlying relationship with said lower surface of said guide track, and operating means coupled to said first and second pads and manually operable between a locking position in which said operating means causes said first and second pads to be driven into engagement with said upper and lower surfaces, respectively, of said guide track to maintain said pivoting seat portion at any position at or between said use and access positions to which it has been pivoted, and a release position in which said operating means allows said first and second pads to be moved out of engagement with said surfaces of said guide track, permitting said pivoting seat portion to be moved at a different position at or between said use and access positions.

16. A vehicle seat assembly comprising:
a fixed seat portion adapted to be mounted on the floor of a vehicle and including adjustment means for providing at least fore and aft position adjustment for the vehicle seat assembly; a pivoting seat portion including a seat cushion and a seat back cushion connected to said seat cushion, said pivoting seat portion providing substantial back and seat support for an occupant of the vehicle seat assembly; and mounting means mounting said pivoting seat portion on said fixed seat portion, said mounting means including a pivot member carried by one of said seat portions and a receptacle on the other one of said seat portions for receiving said pivot member, said pivot member defining a substantially vertical pivot axis for permitting said pivoting seat portion to pivot relative to said fixed seat portion in a substantially horizontal plane between a use position and an access position, and guide means for providing guided movement for said pivoting seat portion relative to said fixed seat portion between said use and access positions, said guide means including at least first and second guide rollers carried by one of said seat portions, and an arcuately shaded guide roller track defined by the other one of said seat portions said pivot means being located to cause the pivoting movement of said pivoting seat portion from said use position to said access position to correspond substantially to the movement of an individual during normal egress from the vehicle, and to cause at least a portion of the front edge of said pivoting seat portion to overlie the rocker of the vehicle when said pivoting seat portion is in said access position, whereby an occupant of the vehicle seat assembly is translated in a direction outboard of the vehicle when said pivoting seat portion is pivoted from said use position to said access position, said fixed seat portion including a first frame and said pivoting seat portion includes a second frame, said pivot member connecting said second frame to said first frame, and said fluid means including a plurality of guide rollers interposed between said second frame and said first frame for guided movement for said pivoting seat portion along a surface of said first frame, said first frame including an arcuate guide track cooperating with said guide rollers for providing said guided movement for said pivoting seat portion, said guide track including a first portion having a first radius of curvature and a second portion having a radius of curvature different from said first radius of curvature.

17. The vehicle seat assembly according to claim 16, wherein said guide means includes first and second guide rollers arcuately spaced from one another and holding means cooperating with at least one of said guide rollers to prevent horizontal tipping of said second frame relative to said first frame while said pivoting seat portion is moving between said normal use and access positions.

18. A vehicle seat assembly comprising: a fixed seat portion adapted to be mounted on the floor of a vehicle and including adjustment means for providing at least fore and aft position adjustment for the vehicle seat assembly; a pivoting seat portion including a seat cushion and a seat back cushion connected to said seat cushion, said pivoting seat portion providing substantial back and seat support for an occupant of the vehicle seat assembly; and mounting means mounting said pivoting seat portion on said fixed seat portion, said mounting means including a pivot member carried by one of said seat portions and a receptacle on the other one of said seat portions for receiving said pivot member, said pivot member defining a substantially vertical pivot axis for permitting said pivoting seat portion to pivot relative to said fixed seat portion in a substantially horizontal plane between a use position and an access position, and guide means for providing guided movement for said pivoting seat portion relative to said fixed seat portion between said use and access positions, said guide means including at least first and second guide rollers carried by one of said seat portions, and an arcuately shaped guide roller track defined by the other one of said seat portions said pivot means being located to cause the pivoting movement of said pivoting seat portion from said use position to said access position to correspond substantially to the movement of an individual during normal egress from the vehicle, and to cause at least a portion of the front edge of said pivoting seat portion to overlie the rocker of the vehicle when said pivoting seat portion is in said access position, whereby an occupant of the vehicle seat assembly is translated in a direction outboard of the vehicle when said pivoting seat portion is pivoted from said use position to said access position, said fixed seat portion including a first frame and said second pivoting seat portion including a second frame, the plane of separation between said first and second frames inclined laterally at an angle relative to the horizontal.

19. A vehicle seat assembly having front and rear inboard corners and front and rear outboard corners, said vehicle seat assembly comprising: a fixed seat portion adapted to be mounted on and secured to the floor of a vehicle; a pivoting seat portion providing substantial cushion support for an occupant of the vehicle seat assembly; mounting means mounting said pivoting seat portion on said fixed seat portion, said mounting means including pivot means located at said rear outboard corner for permitting said pivoting seat portion to pivot about a pivot axis relative to said fixed seat portion between a normal use position and an access position; and guide means for guiding said pivoting seat portion relative to said fixed seat portion during movement of said pivoting seat portion between said normal use and access positions, said guide means including at least first and second guide rollers mounted on said pivoting seat portion, and an arcuately shaped guide roller track defined by said fixed seat portion, said guide track extending from a first location on said fixed seat portion near said rear inboard corner to a second location on said fixed seat portion near said front outboard corner, said first seat portion having a raised portion which defines a fixed guide adjacent to said second location for providing a smooth glide surface for said pivoting seat portion at said second location, means mounting said first guide roller on said pivoting seat portion near said rear inboard corner for turning movement about a generally horizontal axis and in rolling engagement with said guide track, and means mounting said second guide roller on said pivoting seat portion at a location spaced approximately 45 degrees from said first guide roller for turning movement about said horizontal axis and in rolling engagement with said guide track.

20. A vehicle seat assembly comprising: a fixed seat portion adapted to be mounted on and secured to the floor of a vehicle; a pivoting seat portion providing substantial cushion support for an occupant of the vehicle seat assembly; mounting means mounting said pivoting seat portion on said fixed seat portion, said mounting means including pivot means for permitting said pivoting seat portion to pivot about a pivot axis relative to said fixed seat portion between a normal use position and an access position and travel limit means for limiting the pivoting movement of said pivoting seat portion about said pivot axis from said normal use position, said mounting means including guide means for guiding said pivoting seat portion relative to said fixed seat portion during movement of said pivoting seat portion between said normal use and access positions, said guide means including at least first and second guide rollers carried by said pivoting seat portion, and an arcuately shaped guide roller track defined by said fixed seat portion, said travel limit means being mounted on said fixed seat portion adjacent to said guide roller track and being adapted to cooperate with said guide rollers to limit the pivoting movement of said pivoting seat portion, said travel limit means including a notch formed in said fixed seat portion, said notch being located to receive said second guide roller when said pivoting seat portion is in said access position, for maintaining said pivoting seat portion in said access position.

21. The vehicle seat assembly according to claim 19, including bias means for urging said pivoting seat portion toward one of said positions.

22. The vehicle seat assembly according to claim 21, wherein said bias means urges said pivoting seat portion toward said normal use position, and including locking means for permitting said pivoting seat portion to be locked in a plurality of positions intermediate said normal use and access positions.

23. The vehicle seat assembly according to claim 21, wherein said bias means urges said pivoting seat portion toward said access position, and including locking means engaging said pivoting seat portion for maintaining said pivoting seat portion in said normal use position, and means responsive to the opening of the door of the vehicle for releasing said pivoting seat portion from said locking means to permit said pivoting seat portion to be pivoted to said access position by said bias means.

\* \* \* \* \*